(12) United States Patent
Kang et al.

(10) Patent No.: US 8,839,147 B2
(45) Date of Patent: Sep. 16, 2014

(54) MOBILE TERMINAL AND DATA EXTRACTING METHOD IN A MOBILE TERMINAL

(75) Inventors: Rae Hoon Kang, Seoul (KR); Seung Hyun Woo, Seoul (KR); Min Jeong Lee, Seoul (KR); Hyun Ho Jee, Incheon-si (KR); Dong Gwan Im, Seoul (KR); Choon Jae Lee, Gwangju-si (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 12/869,682

(22) Filed: Aug. 26, 2010

(65) Prior Publication Data

US 2011/0084921 A1    Apr. 14, 2011

(30) Foreign Application Priority Data

Oct. 8, 2009   (KR) .................... 10-2009-0095632

(51) Int. Cl.
| | | |
|---|---|---|
| G06F 3/048 | (2013.01) | |
| H04M 1/725 | (2006.01) | |
| G06F 3/041 | (2006.01) | |
| G06F 3/044 | (2006.01) | |
| G06F 3/0481 | (2013.01) | |
| G06F 3/00 | (2006.01) | |
| H04M 1/2745 | (2006.01) | |

(52) U.S. Cl.
CPC ...... *H04M 1/72552* (2013.01); *H04M 2250/12* (2013.01); *H04M 2250/22* (2013.01); *G06F 2203/04101* (2013.01); *H04M 1/274583* (2013.01); *H04M 1/274558* (2013.01); *G06F 3/041* (2013.01); *G06F 3/044* (2013.01); *G06F 3/0481* (2013.01)
USPC .......... 715/823; 715/810; 715/817; 715/821; 715/864

(58) Field of Classification Search
CPC ............ G06F 3/0488; G06F 17/30994; G06F 17/30713; G06F 17/30112; G06F 17/30864; G06F 17/30023; G06F 17/30106
USPC .......................... 715/864, 810, 817, 821, 823
See application file for complete search history.

(56) References Cited

U.S. PATENT DOCUMENTS 5,608,850 A   3/1997   Robertson
6,121,969 A   9/2000   Jain et al.
(Continued)

FOREIGN PATENT DOCUMENTS

WO    2007/083936    7/2007

OTHER PUBLICATIONS

United States Patent and Trademark Office U.S. Appl. No. 13/931,326, Office Action dated Sep. 13, 2013, 14 pages.

*Primary Examiner* — Nicholas Augustine
(74) *Attorney, Agent, or Firm* — Lee, Hong, Degerman, Kang & Waimey

(57) ABSTRACT

A mobile terminal and data extracting method therein are disclosed, by which specific data meeting a specific condition can be selected and extracted conveniently and quickly in the course of displaying a data list constructed with a plurality of data. The present invention includes receiving an input of a touch action for selecting specific data and a classification condition corresponding to the specific data using a displayed data list upon receiving the input of the touch action, selecting at least one data including the specific data as the data including the classification condition from a plurality of data, receiving an input of an extraction command signal for extracting the selected at least one data, and extracting the selected at least one data upon receiving the input of the extraction command signal.

22 Claims, 34 Drawing Sheets

(56) References Cited

U.S. PATENT DOCUMENTS

| | | |
|---|---|---|
| 6,577,330 B1 | 6/2003 | Tsuda et al. |
| 6,621,508 B1 | 9/2003 | Shiraishi et al. |
| 6,725,427 B2 | 4/2004 | Freeman et al. |
| 6,987,512 B2 | 1/2006 | Robertson et al. |
| 7,190,365 B2 | 3/2007 | Fleury |
| 7,889,192 B2 | 2/2011 | Konya et al. |
| 8,049,748 B2 | 11/2011 | Drive et al. |
| 8,432,396 B2 | 4/2013 | Paquette et al. |
| 2002/0033848 A1 | 3/2002 | Sciammarella et al. |
| 2002/0163546 A1 | 11/2002 | Gallo |
| 2003/0112279 A1 | 6/2003 | Irimajiri |
| 2006/0004739 A1* | 1/2006 | Anthony et al. .................. 707/4 |
| 2007/0033220 A1* | 2/2007 | Drucker et al. ........... 707/103 R |
| 2007/0070066 A1 | 3/2007 | Bakhash |
| 2007/0176898 A1 | 8/2007 | Suh |
| 2008/0282158 A1* | 11/2008 | Aaltonen et al. .............. 715/700 |
| 2008/0307360 A1 | 12/2008 | Chaudhri et al. |
| 2009/0089293 A1* | 4/2009 | Garritano et al. ................ 707/10 |
| 2009/0222402 A1 | 9/2009 | Tysowski |
| 2011/0008758 A1* | 1/2011 | Kortas et al. .................. 434/219 |

\* cited by examiner

FIG. 7A

```
Classification condition setting
         – Message

1. Recipient/Originator  ☑ — 701
  2. Date                  ☐
  3. Group                 ☐
  4. Keyword               ☑ — 702

```
Classification condition setting
         – Audio file

1. File name   ☐
  2. Album       ☐
  3. Artist      ☑ — 711
  4. Date        ☐
  5. Keyword     ☑
  6. Genre       ☑ — 712

Classification condition setting
– Picture file

1. Date ☑ —721
2. File name ☐
3. Object ☑ —722
4. Location ☐

Classification condition setting
– Contact

1. Group ☑ —731
2. Partial phone number ☐
3. Contact name ☐

OK (a)             (b)

(a)             (b)

(a)

(b)

(a)

(b)

(a)

(b)

(a)

(b)

(a)

(b)

(a)

(b)

MOBILE TERMINAL AND DATA EXTRACTING METHOD IN A MOBILE TERMINAL

Pursuant to 35 U.S.C. §119(a), this application claims the benefit of earlier filing date and right of priority to Korean Application No. 10-2009-0095632, filed on Oct. 8, 2009, the contents of which are hereby incorporated by reference herein in its entirety.

FIELD OF THE INVENTION

The present invention relates to a mobile terminal, and more particularly, to a mobile terminal and data extracting method in a mobile terminal. Although the present invention is suitable for a wide scope of applications, it is particularly suitable for a mobile terminal provided with a data display function using a touchscreen.

DISCUSSION OF THE RELATED ART

Generally, terminals can be classified into mobile/portable terminals and stationary terminals. The mobile terminals can be classified into handheld terminals and vehicle mounted terminals again according to the possibility of a user's portability.

As functions of mobile terminals are diversified, the mobile terminals are implemented as multimedia players provided with composite functions such as photographing of photos or moving pictures, playback of music or moving picture files, game play and/or broadcast reception, for example.

To support and increase functions of mobile terminals, improvements of structural parts and/or software parts are often required. In mobile terminals according to the related art, in order to extract specific data from a data list constructed with a plurality of data, it is inconvenient for a user to select the specific data to extract one by one. The related art fails to provide a method of selecting and extracting specific data directly without image switching while a data list constructed with a plurality of data is displayed. Moreover, if specific data is selected from a data list constructed with a plurality of data, the related art fails to provide a method of selecting and extracting other data associated with the selected specific data.

SUMMARY OF THE INVENTION

Accordingly, the present invention is directed to a mobile terminal and data extracting method therein that substantially obviate one or more problems due to limitations and disadvantages of the related art.

An object of the present invention is to provide a mobile terminal and data extracting method thereof, by which specific data meeting a specific condition can be selected and extracted conveniently and quickly in the course of displaying a data list having a plurality of data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one aspect a mobile terminal includes a touchscreen and a controller. The touchscreen is configured to display a data list including a plurality of data and to receive a first input for selecting specific data of the plurality of data and a second input for selecting a classification condition corresponding to the specific data. The controller is configured to select at least one data that satisfies the classification condition, including the specific data, from the plurality of data in response to the second input and to extract the selected at least one data from the data list in response to the mobile terminal receiving a third input.

In another aspect, a mobile terminal includes a touchscreen and a controller. The touchscreen is configured to display a data list including a plurality of data and to receive a first input for selecting specific data of the plurality of data and a second input for selecting a classification condition corresponding to the specific data. The controller is configured to select at least one data that satisfies the classification condition, including the specific data, from the plurality of data in response to the second input and to extract the selected at least one data from the data list in response to detection on the touchscreen of a touch and drag action upon the specific data.

In another aspect, a method of extracting data in a mobile terminal includes displaying a data list including a plurality of data on a touchscreen, receiving a first input via the touchscreen for selecting specific data of the plurality of data, receiving a second input via the touchscreen for selecting a classification condition corresponding to the specific data, selecting, via a controller, at least one data that satisfies the classification condition, including the specific data, from the plurality of data in response to the second input, receiving a third input via the mobile terminal for extracting the selected at least one data from the data list, and extracting the selected at least one data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A to 7E are diagrams of screen configurations displaying a process for setting a classification condition based on data according to the present invention.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Mobile terminals described herein can include a mobile phone, a smart phone, a laptop computer, a digital broadcast terminal, a PDA (personal digital assistant), a PMP (portable multimedia player), and a navigation system. Except for a case applicable to a mobile terminal only, it is apparent to those of ordinary skill in the art that the configurations described herein are also applicable to stationary terminals, such as digital TVs and desktop computers.

Figure 1:
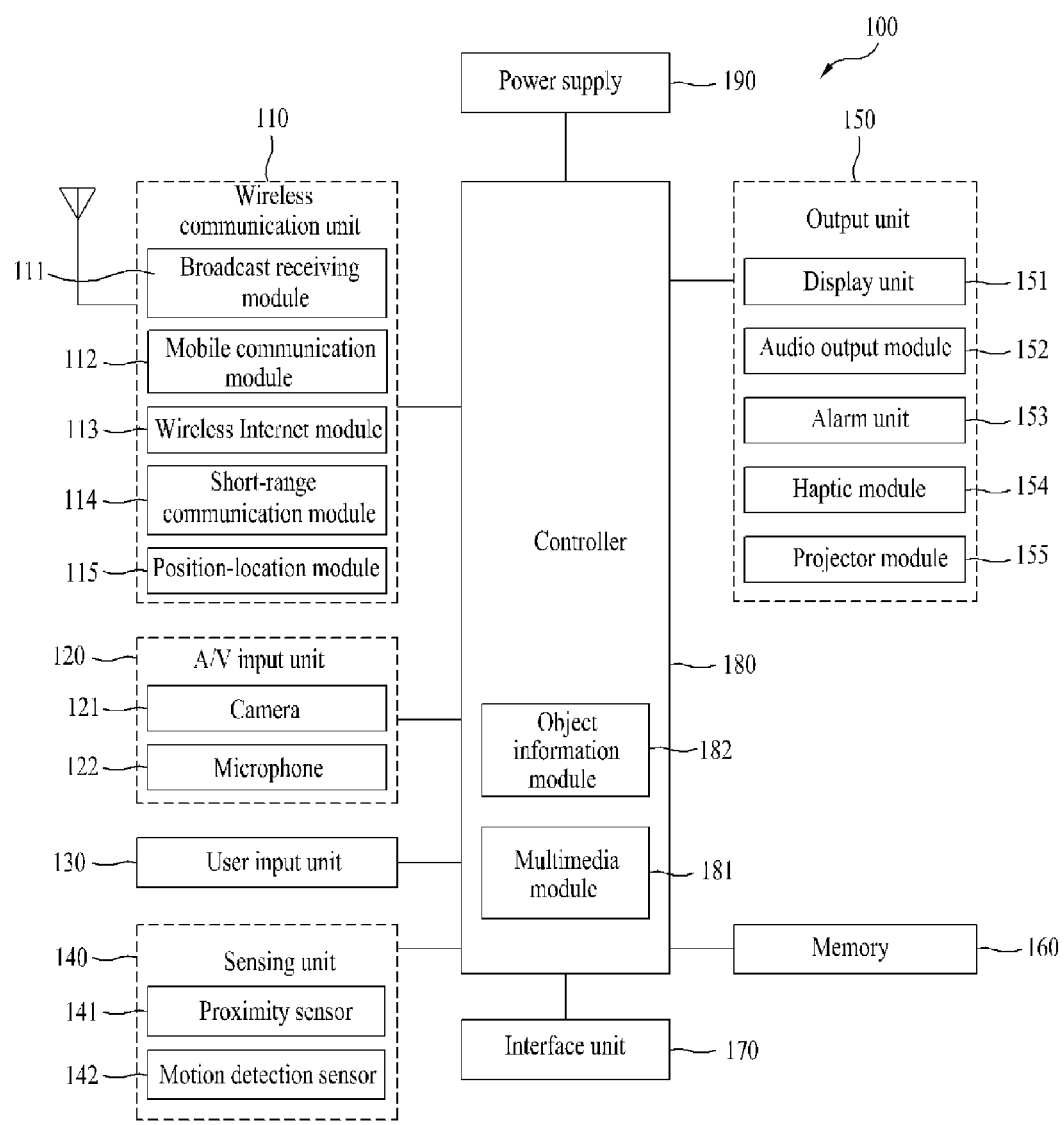
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180 and a power supply unit 190. Although FIG. 1 shows the mobile terminal 100 having various components, it is understood that implementing all of the illustrated components is not a requirement. More or fewer components may alternatively be implemented.

The wireless communication unit 110 may include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel. The broadcast signal and/or broadcast associated information received by the broadcast receiving module 111 may be stored in a suitable storage device, such as in the memory 160.

The external broadcast managing server generally refers to a server that generates and transmits a broadcast signal and/or broadcast associated information or a server that is provided with a previously generated broadcast signal and/or broadcast associated information and then transmits the provided signal or information to the mobile terminal 100. The broadcast signal may be implemented as a TV broadcast signal, a radio broadcast signal, a data broadcast signal, or other known type of signal. If desired, the broadcast signal may include a broadcast signal combined with a TV or radio broadcast signal.

The broadcast associated information includes information associated with a broadcast channel, a broadcast program, or a broadcast service provider. The broadcast associated information can be provided via a mobile communication network, in which case the broadcast associated information can be received by the mobile communication module 112.

The broadcast associated information can be implemented in various forms. For example, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems. The broadcast signal and/or broadcast associated information received by the broadcast receiving module 111 may be stored in a suitable storage device, such as in the memory 160.

The mobile communication module 112 transmits/receives wireless signals to/from one or more network entities (e.g., base station, external terminal, or server). Such wireless signals may represent, for example, audio, video, and data according to text/multimedia message transceivings.

The wireless Internet module 113 supports Internet access for the mobile terminal 100. The wireless Internet module 113 may be internally or externally coupled to the mobile terminal 100. The wireless Internet technology can include WLAN (Wireless LAN) (Wi-Fi), Wibro (Wireless broadband), Wimax (World Interoperability for Microwave Access), HSDPA (High Speed Downlink Packet Access), or other types of known wireless Internet technology.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth™ and ZigBee®.

The position-location module 115 identifies or otherwise obtains the location of the mobile terminal 100. If desired, the position location module 115 may be implemented with a global positioning system (GPS) module.

With continued reference to FIG. 1, the audio/video (A/V) input unit 120 may be configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on a display unit 151. The image frames processed by the camera 121 can be stored in the memory 160 or can be externally transmitted via the wireless communication unit 110. Optionally, at least two cameras 121 can be provided in the mobile terminal 100 according to an environment of use.

The microphone 122 receives an external audio signal while the mobile terminal 100 is in a particular mode, such as phone call mode, recording mode or voice recognition mode. The external audio signal is processed and converted into electric audio data. The processed audio data is transformed into a format transmittable to a mobile communication base station via the mobile communication module 112 when in a call mode. The microphone 122 typically includes assorted noise removing algorithms to remove noise generated in the course of receiving the external audio signal.

The user input unit 130 generates input data in response to user manipulation of an associated input device or devices. Examples of such input devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. The sensing unit 140 may include a proximity sensor 141. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation of the mobile terminal 100 or acceleration/deceleration of the mobile terminal 100.

As an example, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by the power supply 190 and the presence or absence of a coupling or other connection between the interface unit 170 and an external device. The sensing unit 140 may include a proximity sensor 141 and a motion detection sensor 142.

The output unit 150 generates outputs relevant to the senses of sight, hearing, and touch. The output unit 150 may include the display unit 151, an audio output module 152, an alarm unit 153, a haptic module 154, and a projector module 155.

The display unit 151 is typically implemented to visually display (output) information associated with the mobile terminal 100. For example, if the mobile terminal 100 is operating in a phone call mode, the display unit 151 will generally provide a user interface (UI) or graphical user interface (GUI) that includes information associated with placing, conducting, and terminating a phone call. As another example, if the mobile terminal 100 is in a video call mode or a photographing mode, the display unit 151 may additionally or alternatively display images that are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented as a transparent or optical transmittive type, hereafter referred to as a transparent display. A TOLED (transparent OLED) is a representative example of the transparent display. A rear configuration of the display unit 151 can also be implemented in the optical transmittive type. In this configuration, a user is able to see an object at the rear of the terminal body via the area occupied by the display unit 151 of the terminal body.

At least two display units 151 can be provided in the mobile terminal 100. For example, a plurality of display units 151 can be arranged on a single face of the mobile terminal 100 spaced apart from each other or built in one body. Alternatively, a plurality of display units 151 can be arranged on different faces of the mobile terminal 100.

If the display unit 151 and a sensor for detecting a touch action (hereinafter called 'touch sensor') configures a mutual layer structure (hereinafter called 'touchscreen'), the display unit 151 may be used as both an input device and an output device. In this case, the touch sensor can be configured as a touch film, a touch sheet, or a touchpad.

The touch sensor can be configured to convert a pressure applied to a specific portion of the display unit 151 or a variation of a capacitance generated from a specific portion of the display unit 151 to an electric input signal. Moreover, the touch sensor may detect a pressure of a touch as well as a touched position or magnitude of the touch.

If a touch input is made to the touch sensor, a signal(s) corresponding to the touch is transferred to a touch controller. The touch controller processes the signal(s) and then transfers the processed signal(s) to the controller 180. Therefore, the controller 180 may determine whether a prescribed portion of the display unit 151 is touched.

Referring again to FIG. 1, a proximity sensor 141 can be provided on an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor 141 has greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or other type of known proximity sensor. The touchscreen may include an electrostatic capacity proximity sensor configured to detect the proximity of a pointer using a variation of electric field according to the proximity of the pointer and can be classified as the proximity sensor 141.

In the following description, for clarity, an action in which a pointer approaches without contacting the touchscreen, yet is recognized as being located on the touchscreen, is named 'proximity touch'. An action in which a pointer actually touches the touchscreen is named 'contact touch'. The position on the touchscreen proximity-touched by the pointer refers to the position of the pointer that vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be displayed on the touchscreen.

Figure 2:
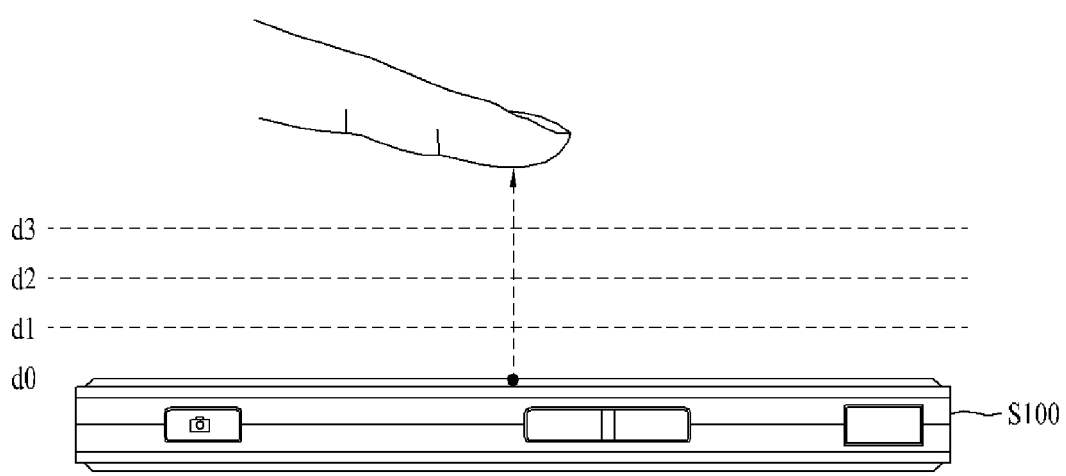
FIG. 2 is a diagram to explain the concept of proximity depth of a proximity sensor.

The proximity sensor 141 described with reference to FIG. 1 is explained in detail with reference to FIG. 2 as follows. FIG. 2 is a conceptual diagram for explaining a proximity depth of the proximity sensor 141. Referring to FIG. 2, when a pointer, such as a user's finger or a pen, for example, approaches the touchscreen, the proximity sensor 141 provided within or in the vicinity of the touchscreen detects the approach of the pointer and outputs a proximity signal in response. The proximity sensor 141 can be configured to output a different proximity signal according to a distance between the pointer and the proximity-touched touchscreen (hereinafter named 'proximity depth').

FIG. 2 illustrates a cross-section of the touchscreen is shown provided with a proximity sensor 141 capable of detecting three proximity depths. It is understood that a proximity sensor capable of detecting more or fewer proximity depths is possible.

If the pointer fully contacts the touchscreen (D0), it is recognized as a contact touch. If the pointer is positioned a distance from the touchscreen that is smaller than D1, it is recognized as a proximity touch to a first proximity depth. If the pointer is positioned a distance from the touchscreen equal to or greater than D1 and less than D2, it is recognized as a proximity touch to a second proximity depth. If the pointer is positioned a distance from the touchscreen smaller than D3 and equal to or greater than D2, it is recognized as a proximity touch to a third proximity depth. If the pointer is positioned a distance from the touchscreen equal to or greater than D3, no proximity touch is recognized.

The controller 180 recognizes the proximity touch as one of various input signals according to the proximity depth and position of the pointer. The controller 180 performs various operation controls according to the various input signals.

Figure 3A:
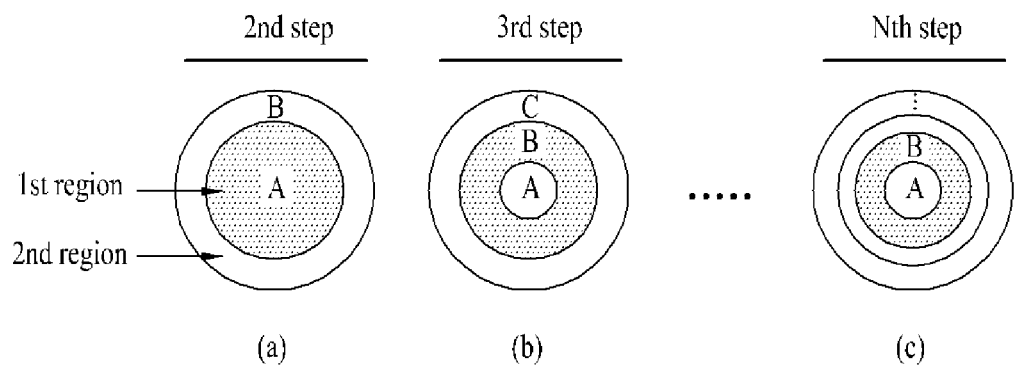
FIG. 3A is a diagram to explain the concept of a proximity touch recognizing area for detecting a proximity signal according to the present invention.
Figure 3B:
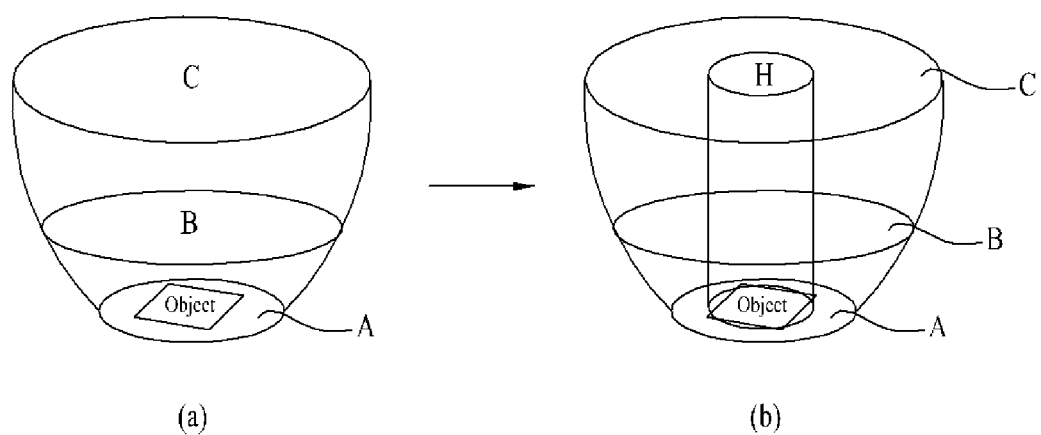
FIG. 3B is a diagram to explain the concept of a haptic area for generating a tactile effect according to the present invention.

FIGS. 3A and 3B are diagrams relating to a proximity touch recognition area and a tactile effect generation region. FIG. 3A represents an object such as an icon or a menu item in a circle type for ease of description.

As shown in FIG. 3A(a), a region for displaying an object on the display unit 151 may be divided into a first region A at a central part and a second region B that encloses or surrounds the first region A. The first and second regions A and B may be configured to generate tactile effects, such as strength or pattern, which differ from each other. For example, the first and second regions A and B may be configured to generate 2-step vibrations by outputting a first vibration when the second region B is touched or outputting a second vibration greater than the first vibration when the first region A is touched.

If both the proximity touch recognition region and the haptic region are simultaneously set in the region displaying the object therein, the haptic region may be set for generating the tactile effect that is different from the proximity touch recognition region for detecting the proximity signal. In particular, the haptic region may be narrower or wider than the proximity touch recognition region.

For example, in FIG. 3A(a), the proximity touch recognition region may be set to the area including both the first and second regions A and B. The haptic region may be set to the first region A.

As shown in FIG. 3A(b), the region having the object displayed therein may be divided into three regions A, B and C. Alternatively, the region having the object displayed therein may be divided into N regions (N>4) as shown in FIG. 3A(c). Each of the divided regions may generate a tactile effect having a different strength or pattern. If a region having a single object represented therein is divided into at least three regions, the haptic region and the proximity touch recognition region may be set to differ from each other according to a use environment.

A size of the proximity touch recognition region of the display 151 may be set to vary according to proximity depth. For example, FIG. 3B(a) shows the proximity touch recognition region is configured to decrease by C→B→A according to the proximity depth for the display 151. The proximity touch recognition region may also be configured to increase by C→B→A according to the proximity depth for the display 151. The haptic region may be set to have a predetermined size, such as the region 'H' in FIG. 3B(b), regardless of the proximity depth for the display 151.

When dividing the object-displayed region for setting of the haptic region or the proximity touch recognition region, one of various schemes of horizontal/vertical division, radial division and/or combinations thereof may be used as well as the concentric circle type division shown in FIG. 3A.

Referring again to FIG. 1, the audio output module 152 functions in various modes including a call-receiving mode, a call-placing mode, a recording mode, a voice recognition mode, or a broadcast reception mode to output audio data that is received from the wireless communication unit 110 or is stored in the memory 160. During operation, the audio output module 152 outputs audio data relating to a particular function (e.g., call received, message received). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event.

The alarm unit 153 outputs a signal for announcing the event occurrence via vibration as well as a video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative tactile effect generated by the haptic module 154. Strength and pattern of the vibration generated by the haptic module 154 are controllable. For example, different vibrations can be output by being synthesized together or can be output in sequence.

The haptic module 154 may generate various tactile effects in addition to vibration. For example, the haptic module 154 may generate an effect of the arrangement of pins vertically moving against a contact skin surface, an effect of injection/suction power of air though an injection/suction hole, an effect of skimming over a skin surface, an effect of contact with an electrode, an effect of electrostatic force, an effect of a hot/cold sense using an endothermic or exothermic device, or other known tactile effects.

The haptic module 154 can be implemented to enable a user to sense the tactile effect through a muscle sense of finger or arm as well as to transfer the tactile effect through direct contact. Optionally, at least two haptic modules 154 can be provided in the mobile terminal 100 in accordance with the corresponding configuration type of the mobile terminal 100.

The projector module 155 is an element for performing an image projector function using the mobile terminal 100. The projector module 155 displays an image, which is identical to or partially different from an image displayed on the display unit 151, on an external screen or wall according to a control signal of the controller 180.

The projector module 155 can include a light source (not shown) generating light (e.g., laser) for projecting an image externally, an image producing means (not shown) for producing an image to output externally using the light generated from the light source, and a lens (not shown) for enlarging the image output externally at a predetermined focus distance. The projector module 155 can further include a device for adjusting a direction of the projected image by mechanically moving the lens or the entire projector module.

The projector module 155 can be classified as a CRT (cathode ray tube) module, an LCD (liquid crystal display) module, a DLP (digital light processing) module or other type of known projector module according to a type of the display means. In particular, the DLP module is operated by a mechanism for enabling the light generated from the light source to reflect on a DMD (digital micro-mirror device) chip and can be advantageous for limiting the size of the projector module 151.

Preferably, the projector module 155 can be provided in a lengthwise direction of a lateral side, front side or back side of the mobile terminal 100. It is understood that the projector module 155 can be provided on any portion of the mobile terminal 100 according to necessity.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data (e.g., use frequency for each phonebook, each message or each multimedia) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. The mobile terminal 100 may operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or other known port types.

The identity module is the chip for storing various types of information for authenticating a use authority of the mobile terminal 100 and can include a User Identify Module (UIM), a Subscriber Identify Module (SIM) and/or a Universal Subscriber Identity Module (USIM). A device having the identity module (hereinafter called an 'identity device') can be manufactured as a smart card. Therefore, the identity device is connectible to the mobile terminal 100 via the corresponding port.

When the mobile terminal 100 is connected to an external cradle, the interface unit 170 provides a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications and video calls. The controller 180 may include a multimedia module 181 that provides multimedia playback. The multimedia module 181 may be configured as part of the controller 180 or implemented as a separate component. The controller 180 may also perform a pattern recognizing process for recognizing a writing input and a picture drawing input performed on the touchscreen as characters or images.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 4A:
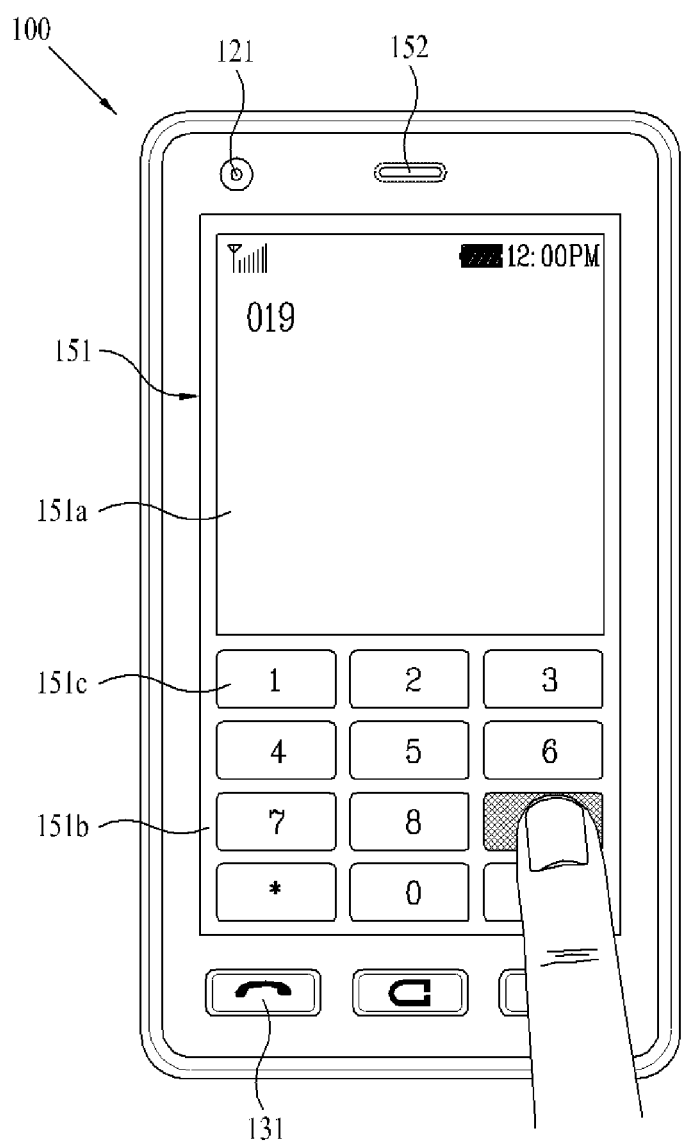
FIGS. 4A and 4B are front diagrams of a mobile terminal according to one embodiment of the present invention for explaining one operational status of the mobile terminal.
Figure 4B:
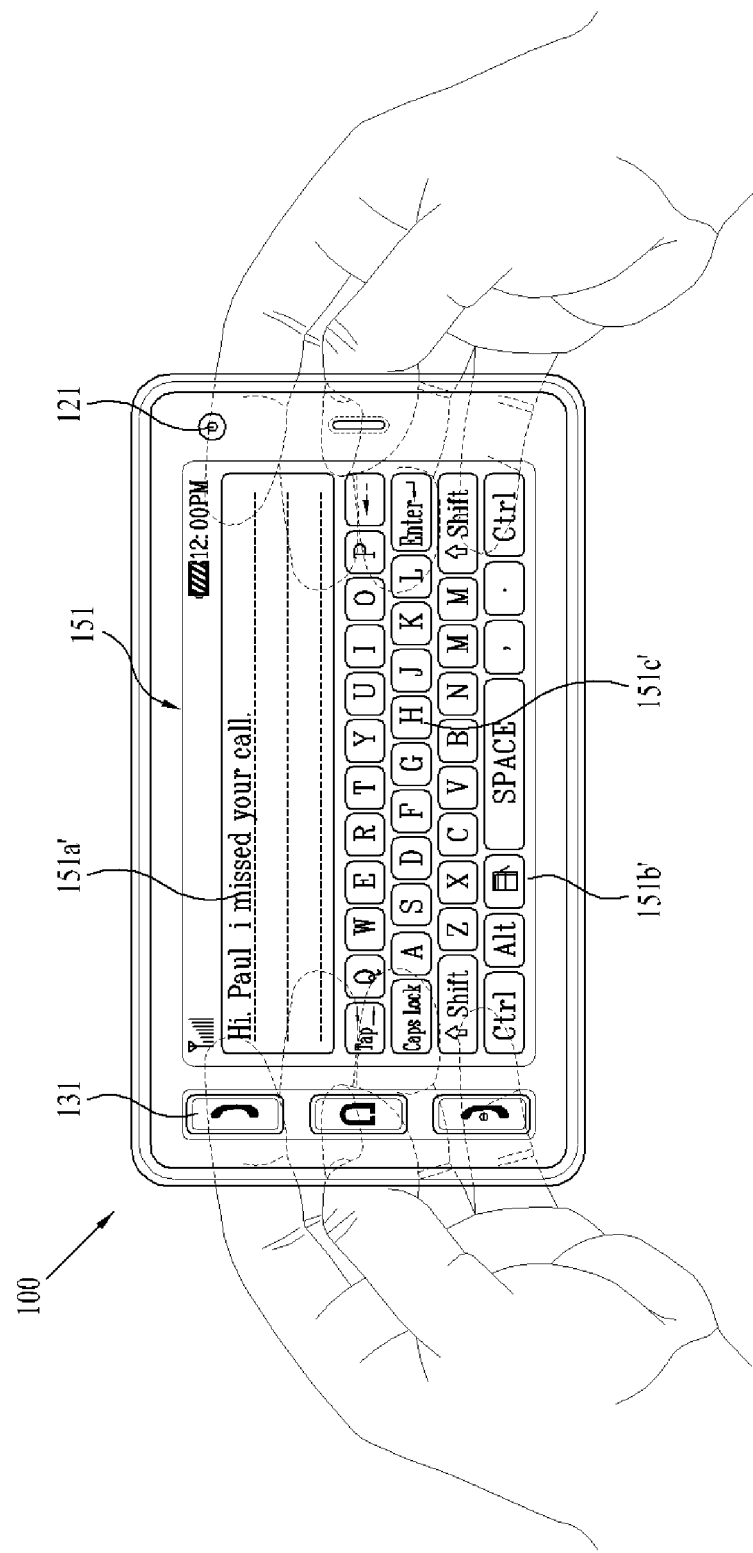

Interconnected operational mechanism between the display unit 151 and a touchpad are explained with reference to FIGS. 4A and 4B. FIGS. 4A and 4B are front-view diagrams of a terminal for explaining an operational state according to one embodiment of the present invention.

Various types of visual information can be displayed on the display unit 151. The information can be displayed as characters, numerals, symbols, graphics and/or icons.

In order to input the information, at least one of the characters, numerals, symbols, graphics and icons is represented as a single predetermined array to be implemented in a keypad formation. This keypad formation can be so-called 'soft keys'. FIG. 4A depicts a touch applied to a soft key input through a front face of a terminal body.

The display unit 151 is operable through an entire area or by being divided into a plurality of regions. In the latter case, a plurality of the regions can be interoperable.

For example, an output window 151a and an input window 151b are displayed on the display unit 151. A soft key 151c representing a digit for inputting a phone number or other information is displayed on the input window 151b. If the soft key 151c is touched, a digit corresponding to the touched soft key is displayed on the output window 151a. If a first manipulating unit 131 is manipulated, a call connection to the phone number displayed on the output window 151a is attempted.

FIG. 4B depicts a touch applied to a soft key through a rear face of a terminal body. FIG. 4A shows the terminal body arranged vertically (portrait), while FIG. 4B shows the terminal body arranged horizontally (landscape). The display unit 151 can be configured to change an output picture according to the arranged direction of the terminal body.

FIG. 4B shows a text input mode activated in the mobile terminal 100. An output window 151a' and an input window 151b' are displayed on the display unit 151. A plurality of soft keys 151c' representing at least characters, symbols or digits can be arranged in the input window 151b'. The soft keys 151c' can be arranged in a QWERTY key formation.

If the soft keys 151c' are touched through the touchpad, the characters, symbols and digits corresponding to the touched soft keys are displayed on the output window 151a'. The touch input via the touchpad is advantageous because blocking the soft keys 151c' by a finger during a touch can be prevented, as compared to a touch input via the display unit 151.

If the display unit 151 and the touchpad are configured as transparent, the user is able to visually see his/her fingers located at the back side of the terminal body. Hence, more accurate touch inputs are possible.

The display unit 151 or the touchpad can be configured to receive a touch input by scroll. A user scrolls the display unit 151 or the touchpad to shift a cursor or pointer located at an entity (e.g., an icon) displayed on the display unit 151. Furthermore, when a finger is shifted on the display unit 151 or the touchpad, a path of the shifted finger can be displayed visually on the display unit 151. This may be useful in editing an image displayed on the display unit 151.

When both the display unit (touchscreen) 151 and the touchpad are touched together within a predetermined time range, one function of the mobile terminal 100 can be executed. The simultaneous touch may occur when the terminal body is held by a user using a thumb and a first finger (clamping). The function can include activation or deactivation of the display unit 151 or the touchpad.

Mobile terminals described herein may include at least one of the elements shown in FIG. 1 and may also include a touchscreen for receiving a touch action that is input externally. In the following description, a method of extracting data in a mobile terminal 100 is explained in detail with reference to the accompanying drawings.

Figure 5:
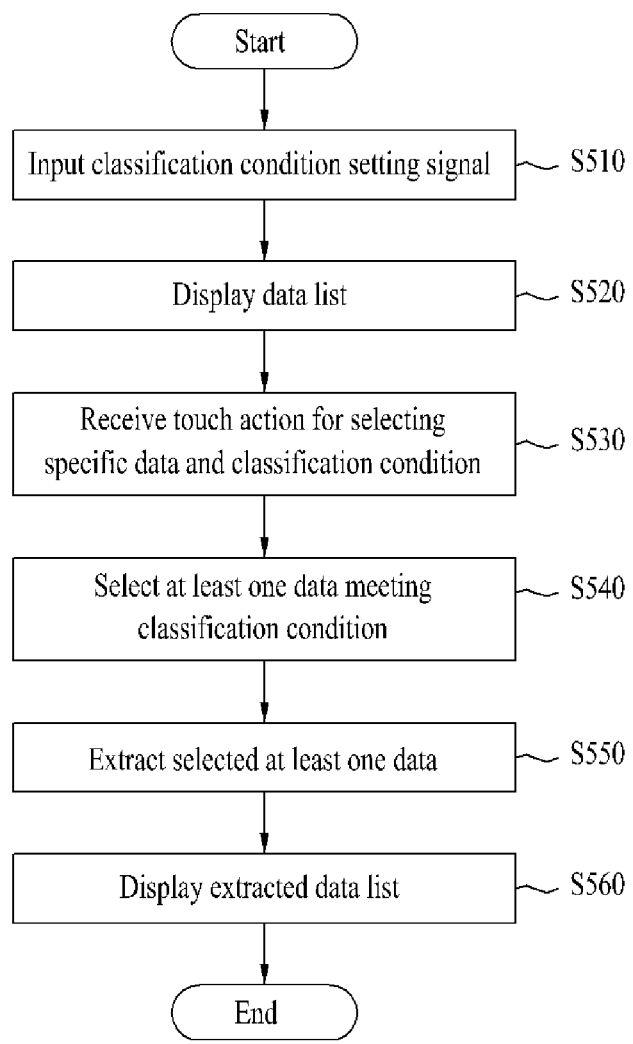
FIG. 5 is a flowchart for a method of extracting data in a mobile terminal according to one embodiment of the present invention.

FIG. 5 depicts a flowchart of a method for extracting data in a mobile terminal 100. Referring to FIG. 5, the mobile terminal 100 receives a signal to set a classification condition to be displayed as information on a data list including a plurality of data (S510). A user may input the setting signal using the user input unit 130 or the touchscreen.

The data list can include a message a list (including a list of received messages, a list of sent messages, and/or a list of messages being written), an audio file list (including an MP3 file list and/or a voice recording file list), a picture file list (including a downloaded picture list, a recorded broadcast list, and/or a photographed picture list), a contact number list (including a list of contact numbers registered in a phonebook, a list of recent incoming/outgoing contact numbers, a contact number list of outgoing/incoming calls, and/or a list of received/sent messages) or a schedule list. The picture file list can further include a still picture file list and a moving picture file list.

The classification condition may refer to a condition for classifying a specific one of a plurality of data included in the data list. Therefore, the control unit 180 sets a classification condition corresponding to the input setting signal as a classification condition to be displayed in the data list. Meanwhile, inputting setting signal (S510) is not mandatory for implementation of the present invention and can be omitted.

Figure 6A:
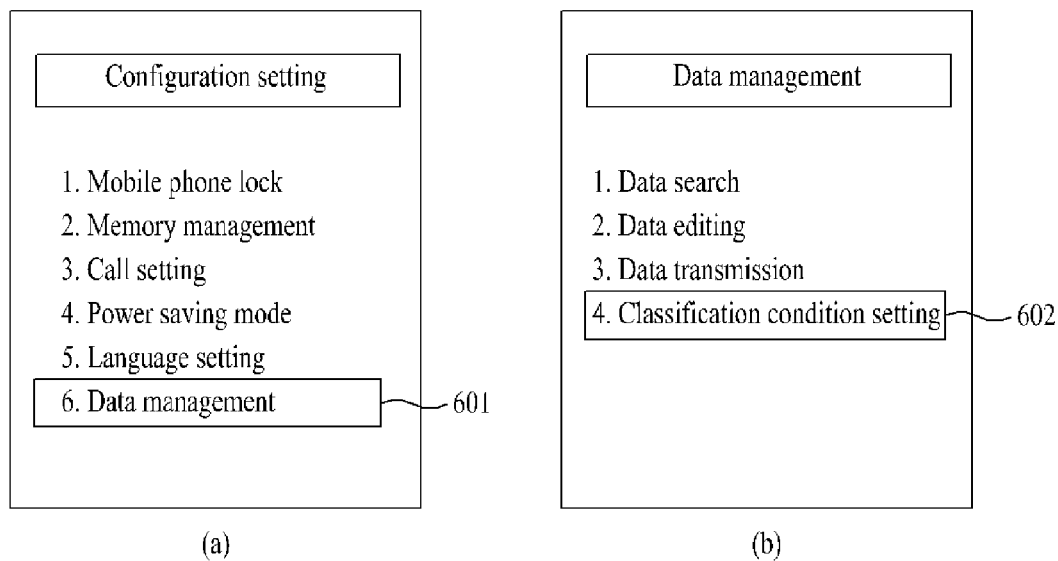
Figure 6B:
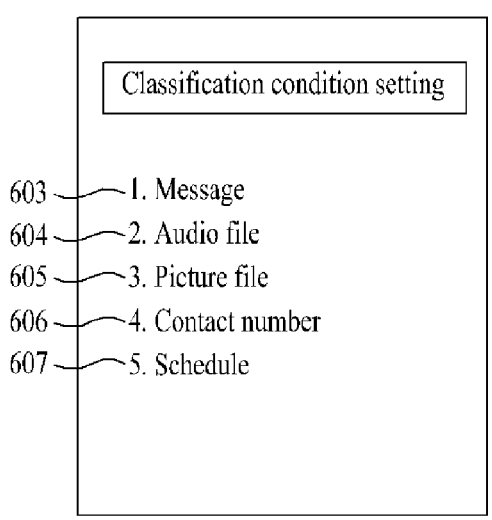

In the following description, a process for inputting a setting signal of a classification condition is explained in detail with reference to FIGS. 6A to 7E. Referring to FIG. 6A, if a menu item 601 ('Data management') is selected through a menu search, as illustrated in FIG. 6A (a), the mobile terminal 100 displays a list of menu items that belong to data management, as illustrated in FIG. 6A (b). Referring to FIG. 6B, if a menu item 602 ('classification condition setting') is selected in FIG. 6A (b), the mobile terminal 100 displays a data type list in order to enable a classification condition to be set for each data type.

For example, a data type such as a message, an audio file, a picture file, a contact number, or a schedule can be included in the data type list. Optionally, if a separate key or a separate key region corresponding to the classification condition setting is selected (not shown in the drawings), the mobile terminal is able to configure the image shown in FIG. 6B.

In the following description, a process for setting a classification condition according to data type is explained in detail. Referring to FIG. 7A, if 'Message' 603 is selected from the data type list shown in FIG. 6B, the mobile terminal 100 displays a classification condition list constructed with classification conditions settable for the message. For example, a recipient/originator, a date, a group to which a recipient/originator belongs, and a keyword can be included in the classification condition list. The mobile terminal 100 receives inputs of setting signals of specific classification conditions 701 and 702 among a plurality of the classification conditions included in the classification condition list from a user.

Referring to FIG. 7B, if 'Audio file' 604 is selected from the data type list shown in FIG. 6B, the mobile terminal 100 displays a classification condition list constructed with classification conditions settable for the audio file. For example, a file name, an album, an artist (e.g., singer, composer, writer, or player), a created date, a keyword, and a genre can be included in the classification condition list. The mobile terminal 100 receives inputs of setting signals of specific classification conditions 711 and 712 among a plurality of the classification conditions included in the classification condition list from a user.

Referring to FIG. 7C, if 'Picture file' 605 is selected from the data type list shown in FIG. 6B, the mobile terminal 100 displays a classification condition list constructed with classification conditions settable for the picture file. For example, a created date, a file name, an object, and a location can be included in the classification condition list. The mobile terminal 100 receives inputs of setting signals of specific classification conditions 721 and 722 among a plurality of the classification conditions included in the classification condition list from a user.

Referring to FIG. 7D, if 'Contact number' 606 is selected from the data type list shown in FIG. 6B, the mobile terminal 100 displays a classification condition list constructed with classification conditions settable for the contact number. For example, a group to which a contact number belongs, a partial phone number, and a contact name can be included in the classification condition list. The mobile terminal 100 receives an input of a setting signal of a specific classification condition 731 among a plurality of the classification conditions included in the classification condition list from a user.

Figure 7E:
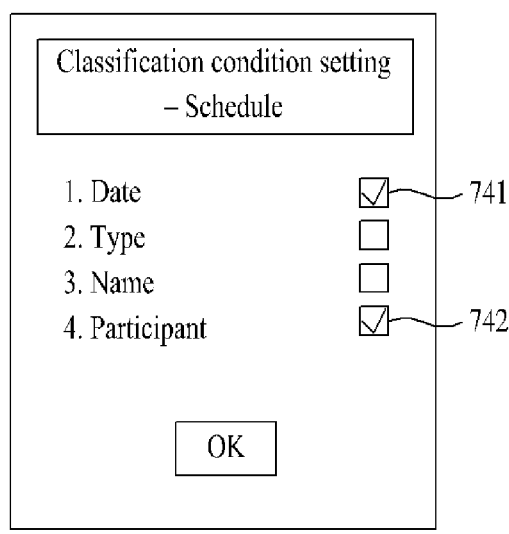

Referring to FIG. 7E, if 'Schedule' 607 is selected from the data type list shown in FIG. 6B, the mobile terminal 100 displays a classification condition list constructed with classification conditions settable for the schedule. For example, a date, a type, a name, and a participant can be included in the classification condition list. The mobile terminal 100 receives inputs of setting signals of specific classification conditions 741 and 742 among a plurality of the classification conditions included in the classification condition list from a user.

Referring again to FIG. 5, the mobile terminal 100 displays a data list including a plurality of data via the display unit 151 under the control of the controller 180 (S520). The classification condition, which was set according to the input setting signal, can be displayed on the data list. Alternatively, the mobile terminal 100 receives an input of a setting signal for a classification condition from a user while displaying the data list and displays the classification condition corresponding to the input setting signal on the data list.

For example, if the data list is a list of received messages and the set classification condition includes a recipient and a keyword (see FIG. 7A), the recipient and the corresponding keyword for each message can be displayed on the received message list. Displaying the data list (S520) can be performed in the course of a data search process, a data editing process, a data storing process or a data related application executing process.

The mobile terminal 100 receives an input via the touchscreen of a touch action for selecting specific data and a specific classification condition corresponding to the specific data using the displayed data list (S530). The mobile terminal 100 identifies a touch action (hereinafter called a first touch action) for commanding a specific data playback or display or identifies a touch action (hereinafter called a second touch) for selecting a corresponding specific classification condition according to a touch pattern.

In one example, the first touch action is a touch performed once and the second touch action is a touch performed two or more times, with reference to a touch count. In another example, the first touch action is a touch performed during a predetermined period of time and the second touch action is a touch performed during the predetermined period of time or later, with reference to a touch duration. In another example, the first touch action is a touch performed at a pressure lower than a predetermined pressure and the second touch action is a touch performed at a pressure equal to or higher than the predetermined pressure, with reference to a touch pressure. Moreover, in another example, if a separate key is selected before an input of the second touch action, the mobile terminal 100 recognizes a next touch action as the second touch action.

Subsequently, the mobile terminal 100 selects at least one data, which meets the selected specific classification condition, under the control of the controller 180 (S540). The specific data selected by the touch action input (S530) is included in the selected at least one data.

When receiving the touch action (S530), the touchscreen may receive an input of a touch action for a display region off the specific classification condition in the specific data. Therefore, when selecting the at least one data (S540), the mobile terminal 100 selects at least one data that meets the specific classification condition corresponding to the display region that is touched. Moreover, if a plurality of the data included in the data list is not displayed on one screen, the mobile terminal 100 selects data that is not currently displayed on the screen (S540) if the specific classification condition is met.

In the following description, receiving the touch action (S530) and selecting the at least one data (S540) are explained in detail with reference to FIGS. 8A to 12B.

FIGS. 8A to 8E are diagrams of screen configurations for selecting a specific message meeting a specific classification condition using a message list according to the present invention. In the following example, a received message list including first to fourth messages 801 to 804 is displayed on the screen.

Figure 8A:
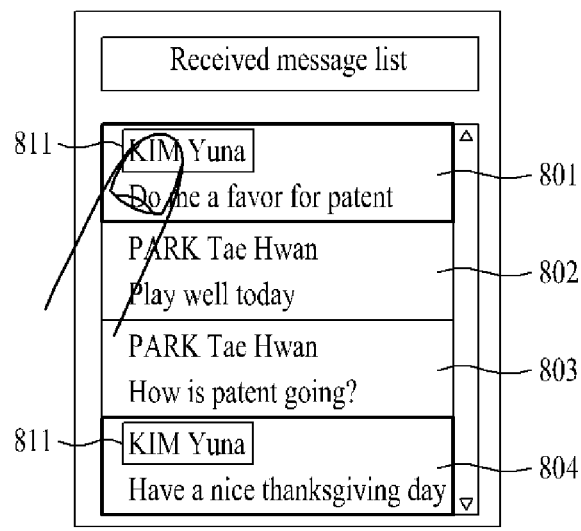
FIGS. 8A to 8E are diagrams of screen configurations for selecting a specific message meeting a specific classification condition using a message list according to the present invention.

Referring to FIG. 8A, if a display region of an originator 'KIM Yuna' 811 in the first message 801 is touched by a user, the mobile terminal 100 selects all messages 801, 804 that include 'KIM Yuna' 811 as the originator from the plurality of the messages 801, 804 included in the received message list.

Figure 8B:
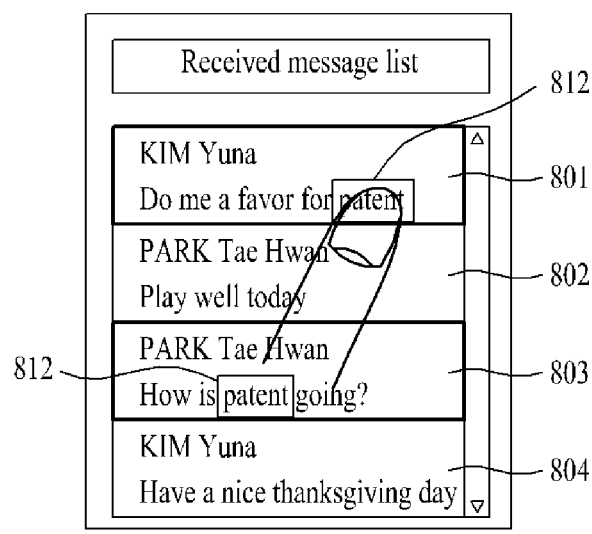

Referring to FIG. 8B, if a display region of a keyword 'patent' 812 in the first message 801 is touched by a user, the mobile terminal 100 selects all messages 801, 803 that include the text 'patent' 812, from the plurality of the messages included in the received message list.

Figure 8C:
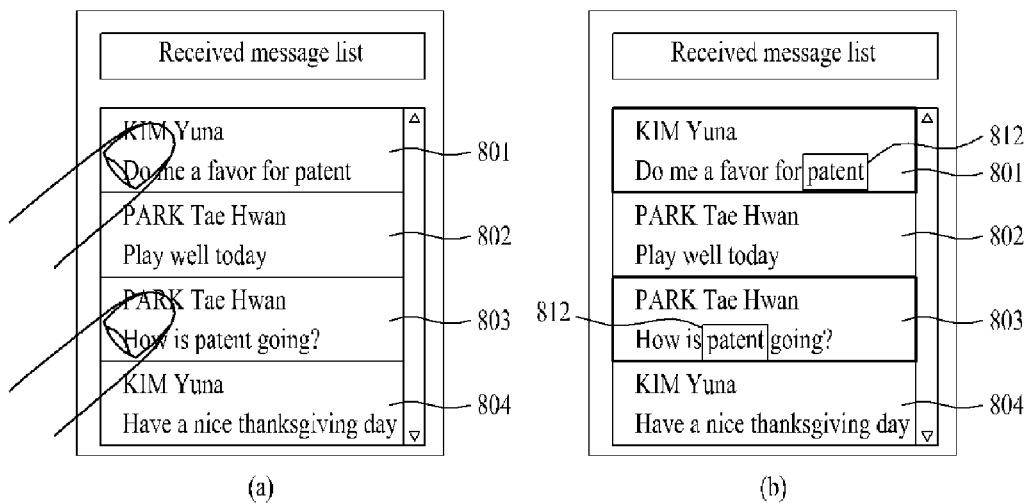

Referring to FIG. 8C (a), if the first message 801 and the third message 803 are touched by a user, the mobile terminal 100 checks a common classification condition of the first and third messages 801 and 803. If the checked common classification condition is the keyword 'patent' 812, the mobile terminal 100 selects all messages 801 and 803 including the text 'patent' 812 from the plurality of the messages included in the received message list, as illustrated in FIG. 8C (b).

Figure 8D:
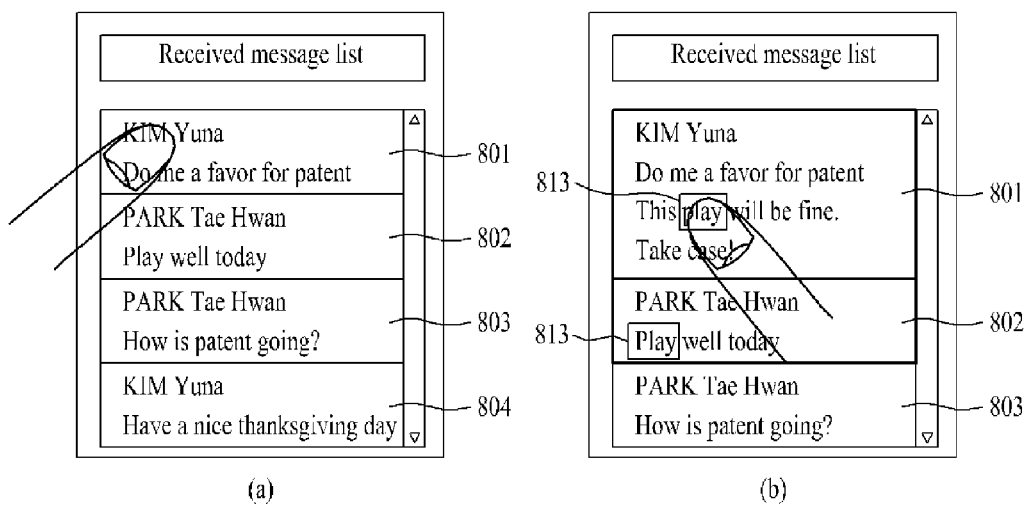

If the first message 801 is selected, as illustrated in FIG. 8D (a), the mobile terminal 100 displays an entire message content of the first message 801 on the received message list, as illustrated in FIG. 8D (b). If a display region of a keyword 'play' 813 is selected from the entire message content of the first message 801, the mobile terminal 100 selects all messages 801 and 802 including the text 'play' 813 from the plurality of the messages included in the received message list, as illustrated in FIG. 8D (b).

Figure 8E:
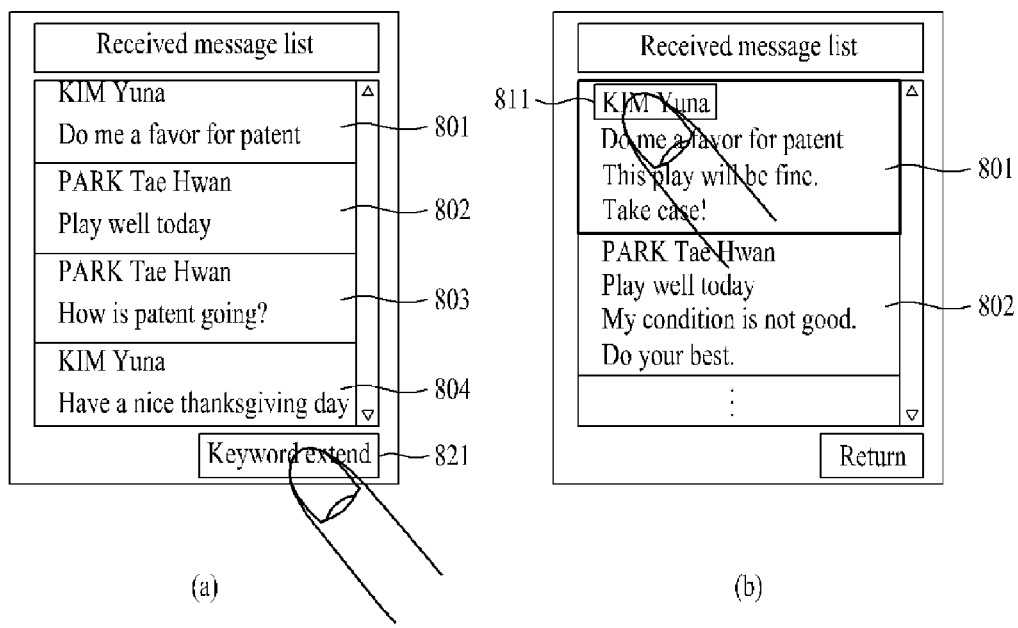

Referring to FIG. 8E (a), while the received message list is displayed, if a key region 821 corresponding to a keyword extension command is selected, the mobile terminal 100 receives an input of a keyword extension command signal. After receiving the input of the keyword extension command signal, the mobile terminal 100 displays the corresponding keyword(s) for each of the messages or the entire message contents including the corresponding keyword(s), as illustrated in FIG. 8E (b).

Figure 9A:
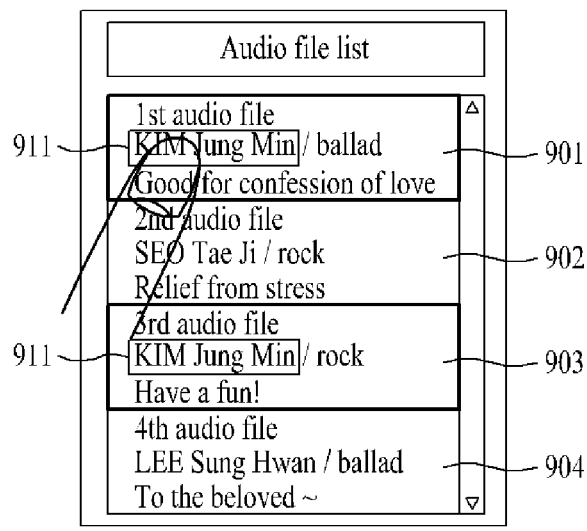
FIGS. 9A to 9C are diagrams of screen configurations for selecting a specific audio file meeting a specific classification condition using an audio file list according to the present invention.
Figure 9B:
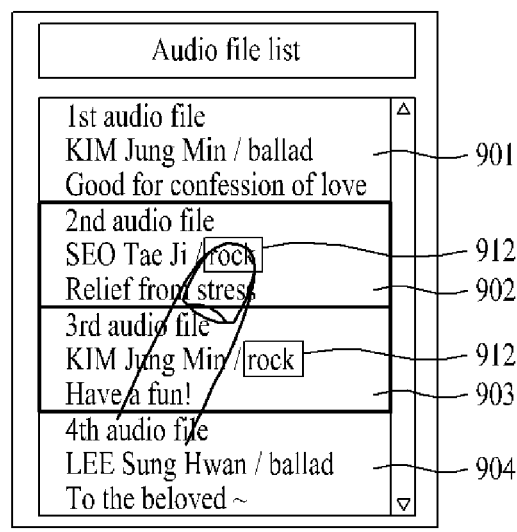
Figure 9C:
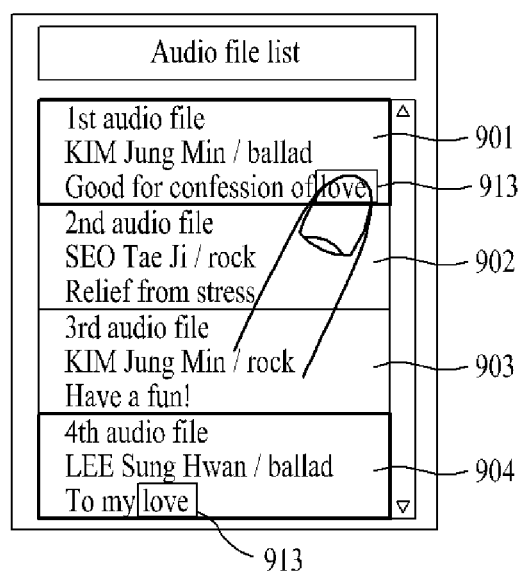

FIGS. 9A to 9C are diagrams of screen configurations for selecting a specific audio file meeting a specific classification condition using an audio file list according to the present invention. In the following example, first to fourth audio files 901 to 904 are included in an audio file list displayed on the screen.

Referring to FIG. 9A, if a display region of a singer name 'KIM Jung Min' 911 in the first audio file 901 is touched by a user, the mobile terminal 100 selects all audio files 901, 903 for which the singer name is the 'KIM Jung Min' 911 from the plurality of audio files included in the audio file list.

Referring to FIG. 9B, if a display region of a genre 'rock' 912 in the second audio file 902 is touched by a user, the mobile terminal 100 selects all audio files 902, 903 for which the genre is 'rock' 912 from the plurality of audio files included in the audio file list.

Referring to FIG. 9C, if a display region of a keyword 'love' 913 in the first audio file 901 is touched by a user, the mobile terminal 100 selects all audio files 901, 904 containing the word 'love' 913 from the plurality of audio files included in the audio file list.

Figure 10A:
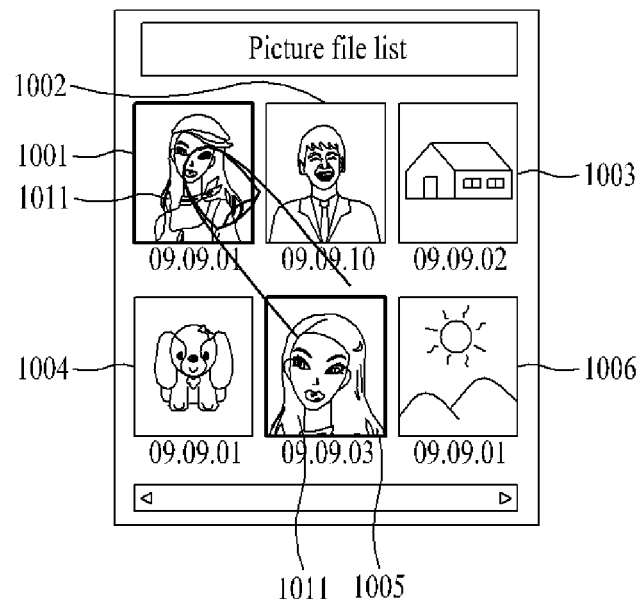
FIGS. 10A and 10B are diagrams of screen configurations for selecting a specific picture file meeting a specific classification condition using a picture file list according to the present invention.
Figure 10B:
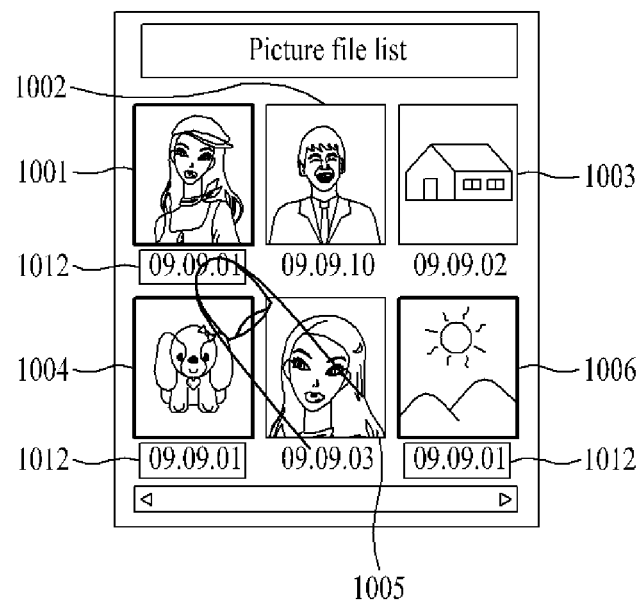

FIGS. 10A and 10B are diagrams of screen configurations for selecting a specific picture file meeting a specific classification condition using a picture file list according to the present invention. In the following example, a picture file list includes first to sixth pictures 1001 to 1006 represented as thumbnails.

Referring to FIG. 10A, if a specific object 1011 in the first picture 1001 is touched by a user, the mobile terminal 100 selects all picture files 1001, 1005 that include the specific object 1011 from the plurality of picture files included in the picture file list.

Referring to FIG. 10B, if a created date '09.09.01' 1012 of the first picture 1001 is touched by a user, the mobile terminal 100 selects all picture files 1001, 1004 for which the created date is '09.09.01' 1012 from the plurality of picture files included in the picture file list.

Figure 11A:
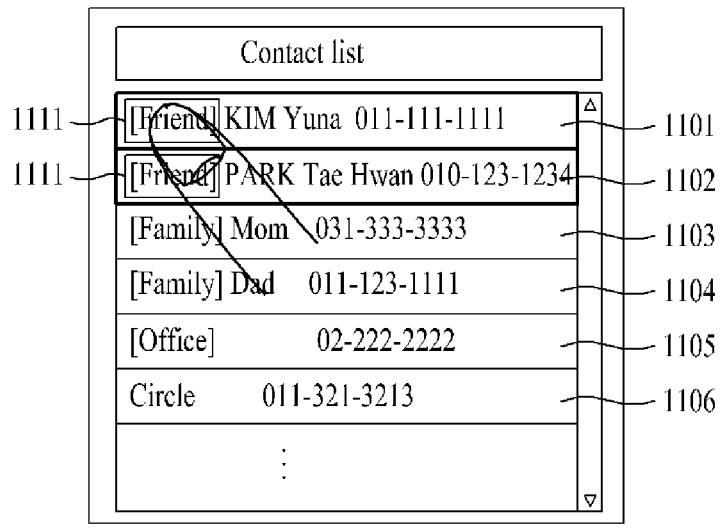
FIGS. 11A and 11B are diagrams of screen configurations for selecting a specific contact number meeting a specific classification condition using a contact number list according to the present invention.
Figure 11B:
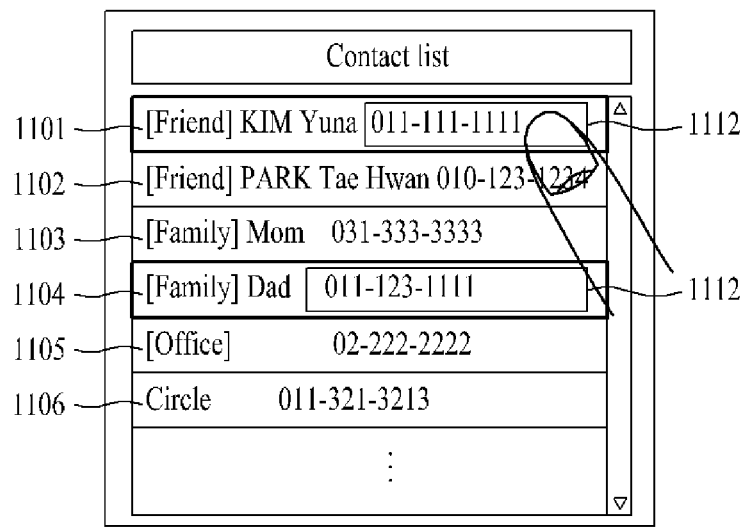

FIGS. 11A and 11B are diagrams of screen configurations for selecting a specific contact number meeting a specific classification condition using a contact number list according to the present invention. In the following example, first to sixth contact numbers 1101 to 1106 are included in a contact number list displayed on the screen.

Referring to FIG. 11A, if a display region of a group 'Friend' 1111 in the first contact number 1101 is touched by a user, the mobile terminal 100 selects all contact numbers 1101, 1102 belonging to the group 'Friend' 1111 from the plurality of the contact numbers included in the contact number list.

Referring to FIG. 11B, if a display region of a phone number 1112 in the first contact number 1101 is touched by a user, the mobile terminal 100 selects all contact numbers 1101, 1104 matching the phone number 1112 of the first contact number 1101 entirely or partially from the plurality of the contact numbers included in the contact number list.

Figure 12A:
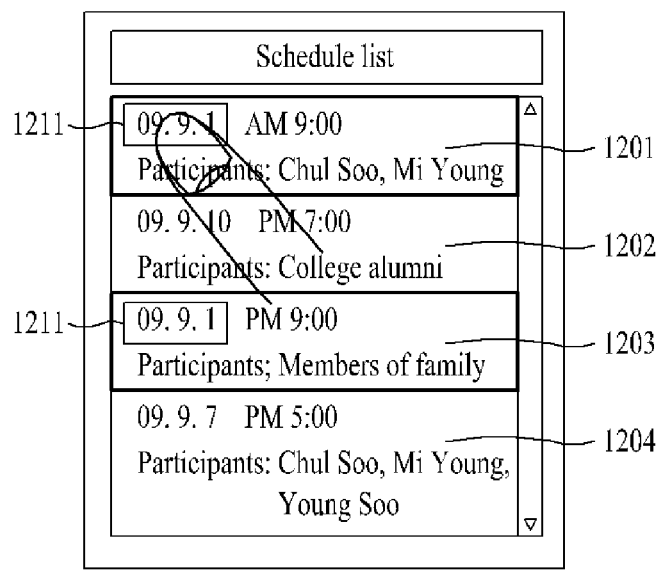
FIGS. 12A and 12B are diagrams of screen configurations for selecting a specific schedule meeting a specific classification condition using a schedule list according to the present invention.
Figure 12B:
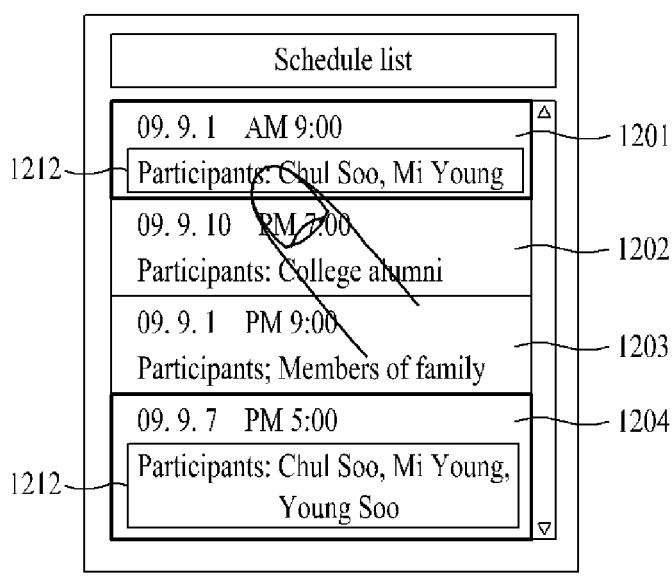

FIGS. 12A and 12B are diagrams of screen configurations for selecting a specific schedule meeting a specific classification condition using a schedule list according to the present invention. In the following example, first to fourth schedules 1201 to 1204 are included in a schedule list displayed on the screen.

Referring to FIG. 12A, if a display region of a date '09.9.1' 1211 in the first schedule 1201 is touched by a user, the mobile terminal 100 selects all schedules 1201, 1203 for which a date corresponds to the '09.9.1' 1211 from the plurality of the schedules included in the schedule list.

Referring to FIG. 12B, if a display region of a participant 1212 in the first schedule 1201 is touched by a user, the mobile terminal 100 selects all schedules 1201, 1204 for which a participant matches the participant 1212 of the first schedule 1201 entirely or partially from the plurality of the schedules included in the schedule list.

It is understood that the common classification condition selection shown in FIG. 8C, the entire content display of the specific message shown in FIG. 8D or the keyword extension shown in FIG. 8E can be applied to an audio file list, a picture file list, a contact number list or a schedule list as well.

Referring again to FIG. 5, the mobile terminal 100 extracts the selected at least one data under the control of the controller 180 (S550). The mobile terminal 100 extracts the selected at least one data (S550) in response to receiving an input of an extraction command signal externally.

For example, the controller 180 detects at least a touch and drag action in one direction from one of the selected at least one or more data, a tapping action in one direction, and/or an incline action in one direction. Upon detecting one of the above actions, the controller 180 receives the input of the extraction command signal.

The mobile terminal 100 separately creates a data storage region including the at least one extracted data. Therefore, the mobile terminal 100 displays an extracted data list constructed with the at least one data included in the created data storage region or outputs the at least one data included in the created data storage region in response to receiving an input of a search signal from a user. For example, the data storage region can include a folder.

Subsequently, the mobile terminal 100 displays the extracted data list including the at least one extracted data via the display unit 151 under the control of the controller 180 (S560). Alternatively, displaying the extracted data list (S560) can include displaying the entire data list, the remaining data list including the rest of the data except the extracted at least one data, or the extracted data list including the extracted at least one data. Furthermore, while the entire data list or the remaining data list is displayed, the mobile terminal 100 displays the extracted data list according to a user selection.

In the following description, extracting the selected at least one data (S550) and displaying the extracted data list (S560) are explained in detail with reference to FIGS. 13A to 17C. FIGS. 13A to 13G are diagrams of screen configurations for extracting a specific message meeting a specific classification condition using a message list according to the present invention. In the following example, a received message list is taken as an example of a data list.

Figure 13A:
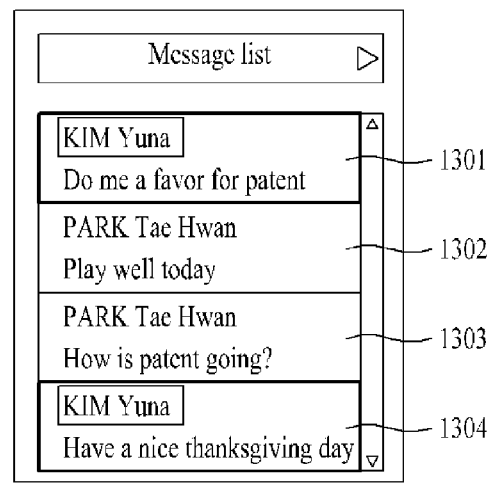
FIGS. 13A to 13G are diagrams of screen configurations for extracting a specific message meeting a specific classification condition using a message list according to the present invention.
Figure 13B:
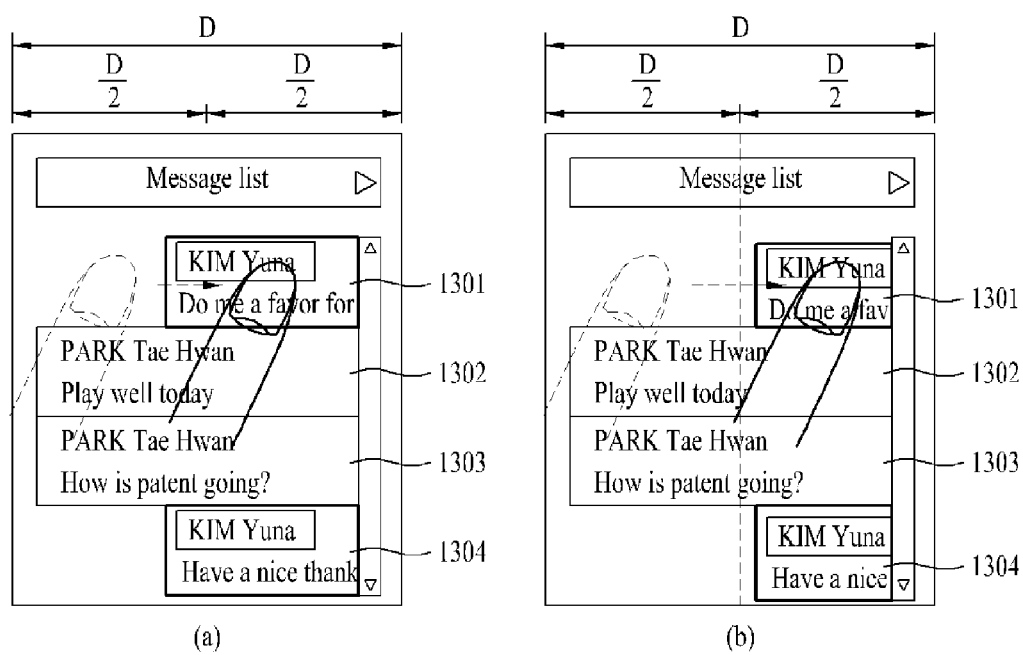

While the message(s) for which 'KIM Yuna' is the originator are selected from a plurality of the messages included in the received message list, as illustrated in FIG. 8A, the mobile terminal 100 receives an input of a touch and drag action in a first direction from a random point of a specific one 1301 of the selected message(s), as illustrated in FIG. 13B.

The mobile terminal 100 extracts the selected message(s) and shifts a position of the extracted message(s) in the first direction, as illustrated in FIG. 13B, in response to receiving an extraction command signal corresponding to the touch and drag action in the first direction.

Figure 13C:
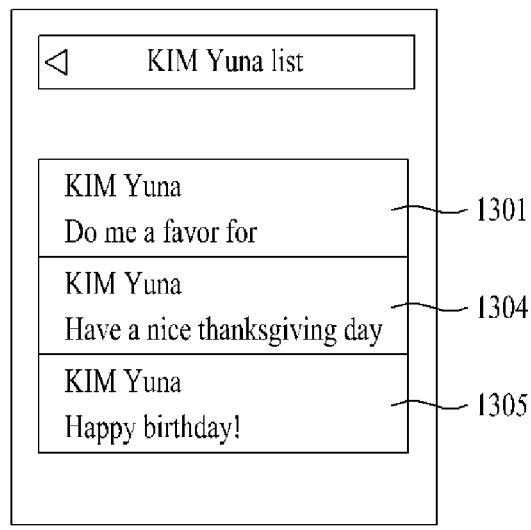

If the position of the extracted message(s) is shifted a predetermined distance (e.g., at least one half (D/2) of a horizontal length D of an entire display region) in the first direction, as illustrated in FIG. 13B (b), the mobile terminal 100 displays an extracted message list including the extracted messages 1301, 1304 and 1305 on the screen, as illustrated in FIG. 13C. The fifth message 1305 is included in the received message list but is not displayed on the screen displayed in FIG. 13A. As mentioned in the foregoing description, all data included in the data list are set as extraction target data even though they are not displayed on the screen.

Figure 13D:
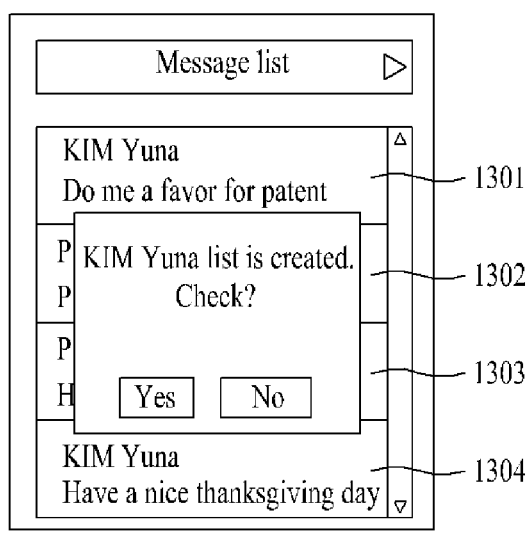

Alternatively, if the position of the extracted message(s) is shifted a predetermined distance or farther in the first direction, as illustrated in FIG. 13B (b), the mobile terminal 100 enables a user to select whether to check the extracted data list while the received message list is displayed, as illustrated in FIGS. 13A and 13D. If 'Yes' is selected by a user in FIG. 13D, the mobile terminal 100 displays the image shown in FIG. 13C.

Figure 13E:
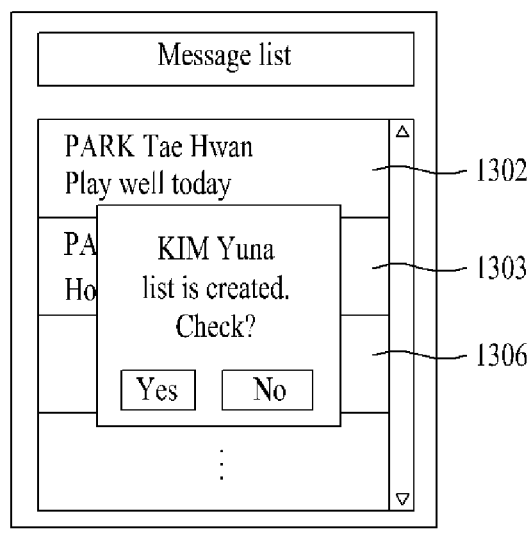

Alternatively, if the position of the extracted message(s) is shifted a predetermined distance or farther in the first direction, as illustrated in FIG. 13B (b), the mobile terminal 100 enables a user to select whether to check the extracted data list while the remaining message list including the rest of the messages except for the extracted message(s) is displayed, as illustrated in FIG. 13E. If 'Yes' is selected by a user in FIG. 13E, the mobile terminal 100 displays the image shown in FIG. 13C.

Figure 13F:
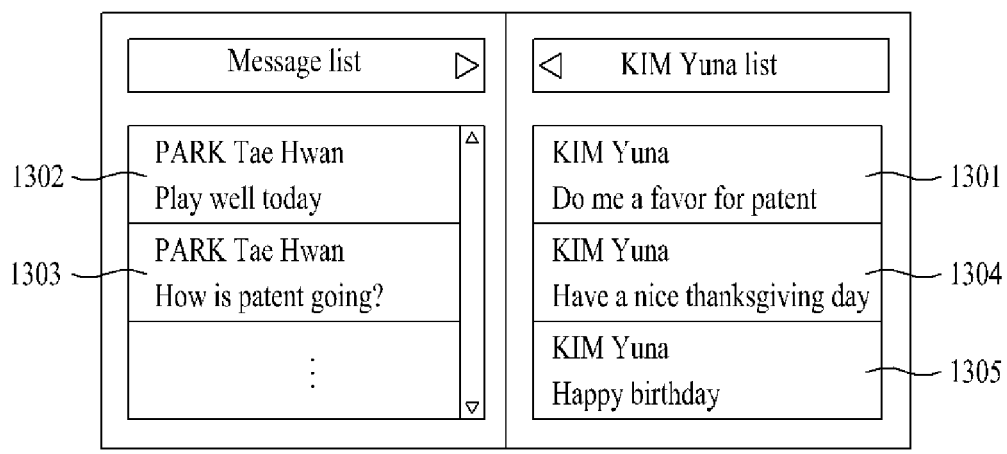

Alternatively, if the position of the extracted message(s) is shifted a predetermined distance or farther in the first direction, as illustrated in FIG. 13B (b), the mobile terminal 100 sets a horizontal view mode, divides the screen into a plurality of regions in a horizontal direction, and displays the remaining message list on the first region and the extracted message list on the second region, as illustrated in FIG. 13F.

Figure 13G:
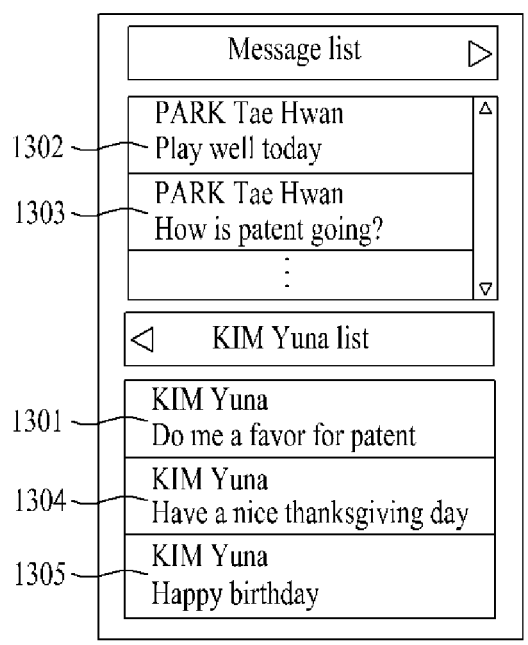

Alternatively, if the position of the extracted message(s) is shifted a predetermined distance or farther in the first direction, as illustrated in FIG. 13B (b), the mobile terminal 100 sets a vertical view mode, divides the screen into a plurality of regions in a vertical direction, and displays the remaining message list on the third region and the extracted message list on the fourth region, as illustrated in FIG. 13G.

The direction of the touch and drag action can include other directions other than the horizontal direction. It is not mandatory for the touch and drag action to be performed in the predetermined distance or farther. If the touch and drag action is completed, the above-described display operation is performed (not shown in the drawings).

The mobile terminal 100 is able to separately create an extracted message list by re-extracting data that meets a specific classification condition from the at least one or more data included in the extracted message list. For example, if a classification condition of the extracted message list is 'KIM Yuna', a message meeting a keyword 'patent' is re-extracted from the message(s) meeting the originator 'KIM Yuna' classification condition and a separately created extracted message list is then constructed with the message that meets both of the originator 'KIM Yuna' and the keyword 'patent' classification conditions.

Figure 14A:
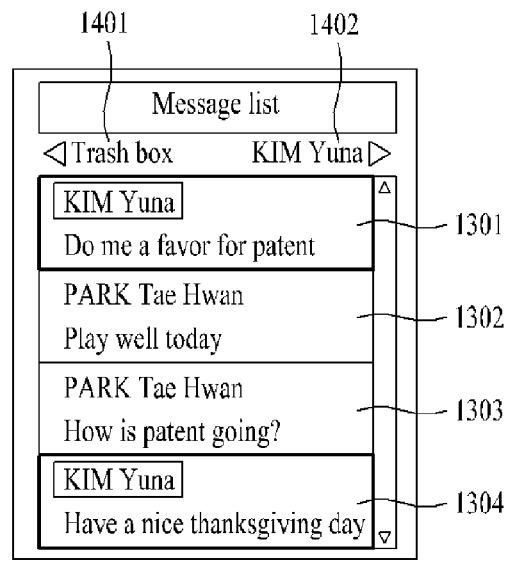
FIGS. 14A and 14B are diagrams of screen configurations for extracting a specific message using a data extraction guide according to the present invention.
Figure 14B:
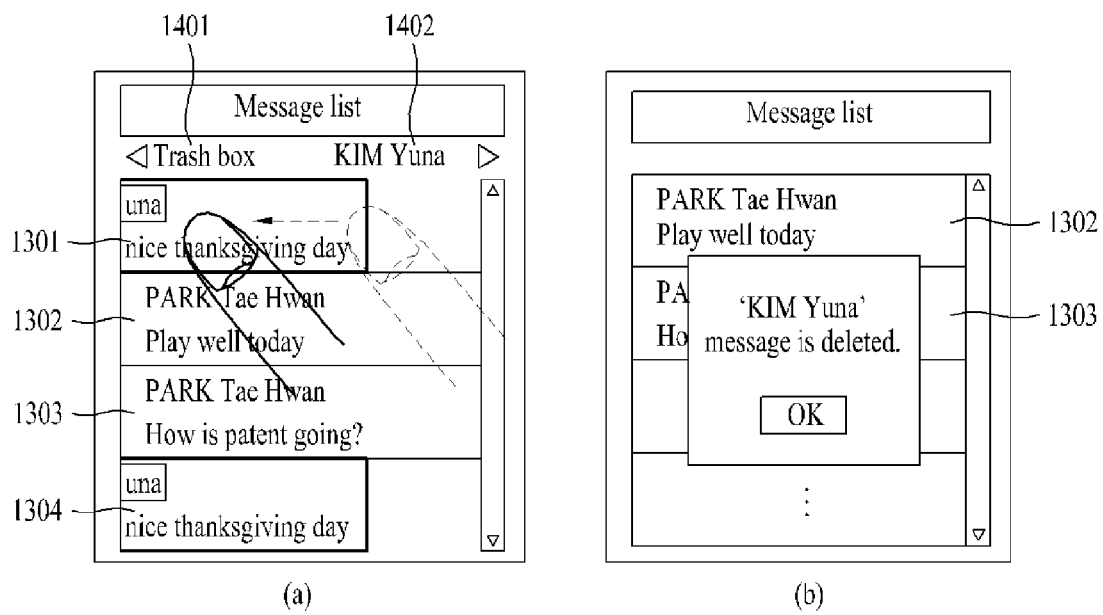

FIGS. 14A and 14B are diagrams of screen configurations for extracting a specific message using a data extraction guide according to the present invention. Referring to FIG. 14A, if messages including the originator 'KIM Yuna' as an example of a specific classification condition are selected, the mobile terminal 100 displays a first guide identifier 1401 and a second guide identifier 1402 to guide data extraction.

Referring to FIG. 14B, if an input of a touch and drag action in a left direction corresponding to the first guide identifier 1401 is received from a random point of a specific message 1301 among the selected messages, the mobile terminal 100 extracts the selected messages and shifts positions of the extracted messages in the left direction, as illustrated in FIG. 14 B (a). If the touch and drag action is completed, the mobile terminal 100 outputs a text message indicating that the position-shifted messages are shifted to a trash box indicated by the first guide identifier 1401 and deleted, as illustrated in FIG. 14 B (b).

Alternatively, if an input of a touch and drag action in a right direction corresponding to the second guide identifier 1402 is received from a random point of a specific message 1301 among the selected messages, the mobile terminal 100 extracts the selected messages and then shifts extracted messages in the right direction. If the touch and drag action is completed, the mobile terminal 100 stores the extracted messages in a storage region 'KIM Yuna' indicated by the second guide identifier 1402 (not shown in the drawings).

The guide identifiers can be arranged in a top-to-bottom direction or a diagonal direction, rather than the right-to-left direction. The user can select whether to display the guide identifiers (not shown in the drawings).

Figure 15A:
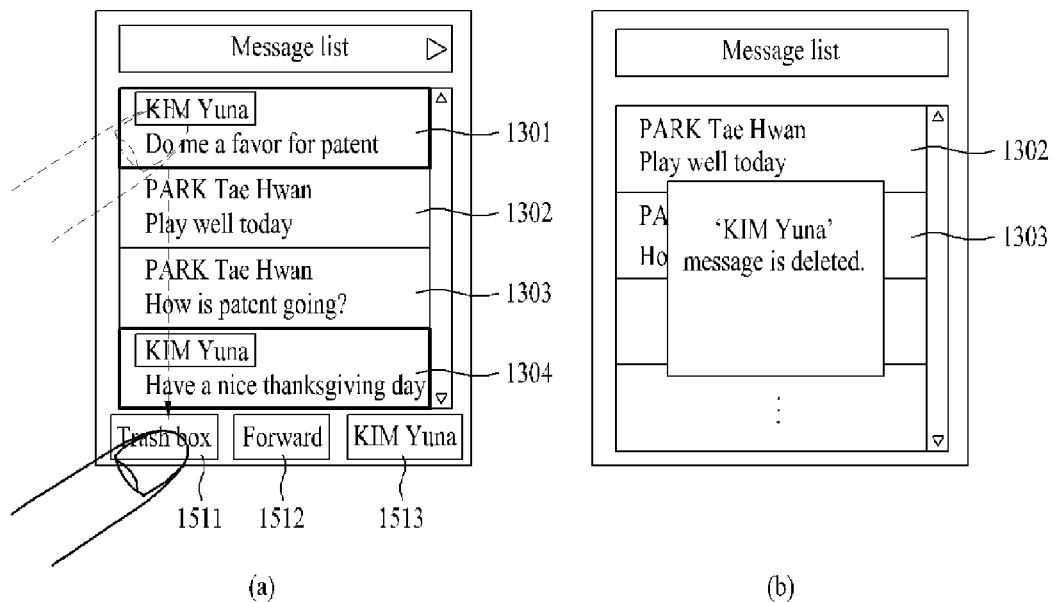
FIGS. 15A to 15C are diagrams of screen configurations for extracting a specific message using a data control icon according to the present invention.
Figure 15B:
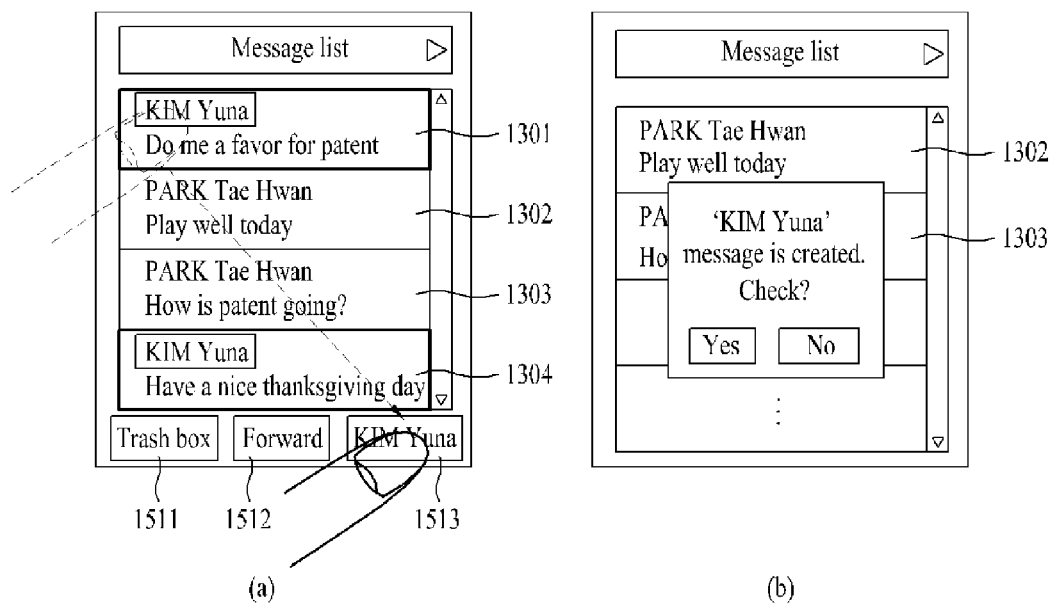
Figure 15C:
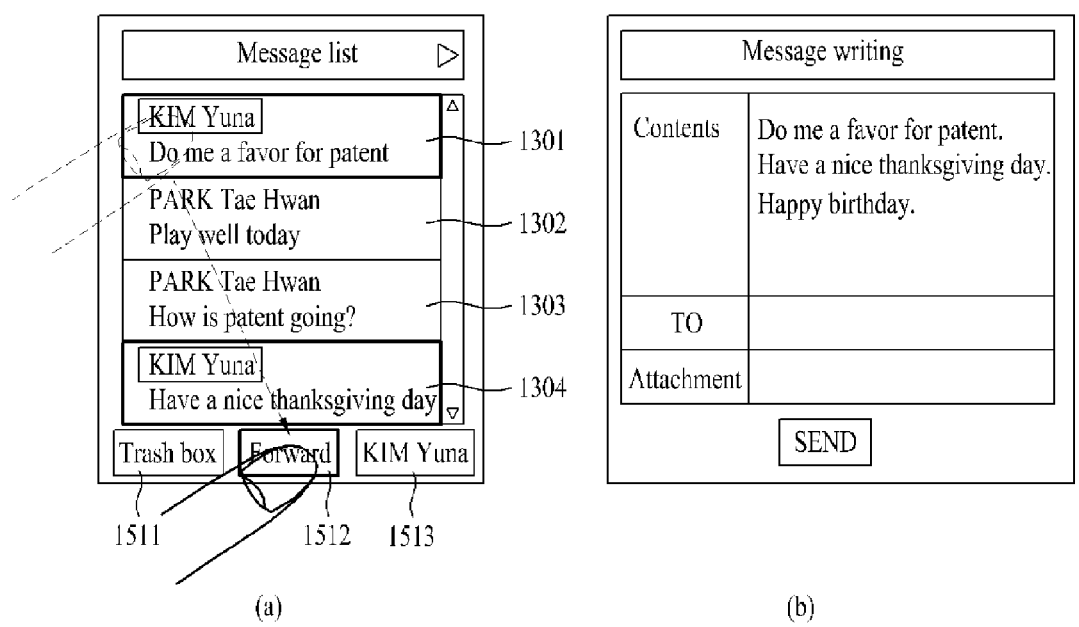

FIGS. 15A to 15C are diagrams of screen configurations for extracting a specific message using a data control icon according to the present invention. In the following example, a received message list is taken as an example of a data list with first to fourth messages 1301 to 1304 included in the received message list displayed on a screen.

For example, if messages including the originator 'KIM Yuna' are selected from the received message list, the mobile terminal 100 displays first to third data control icons 1511 to 1513 on one region of the screen, as illustrated in FIGS. 15A to 15C. In the following description, the first to third data control icons 1511 to 1513 are named a 'Trash box' icon, a 'Forward' icon and a 'KIM Yuna' icon, respectively.

Referring to FIG. 15A, if a touch and drag action to the 'Trash box' icon 1511 is received from a random point of the first message 1301 among the selected messages, as illustrated in FIG. 15A (a), the mobile terminal 100 extracts and shifts the selected messages to the trash box and indicates that the selected messages are deleted, as illustrated in FIG. 15A (b).

If a touch and drag action to the 'KIM Yuna' icon 1512 is received from a random point of the first message 1301 among the selected messages, as illustrated in FIG. 15B (a), the mobile terminal 100 creates a storage region 'KIM Yuna' by extracting the selected messages and displays a message list constructed with the extracted messages, as illustrated in FIG. 15B (b).

If a touch and drag action to the delivery icon 1513 is received from a random point of the first message 1301 among the selected messages, as illustrated in FIG. 15C (a), the mobile terminal 100 extracts the selected messages and sets a writing state of a new message including content of each extracted message, as illustrated in FIG. 15C (b). Each of the extracted messages can be attached as an attachment file of the new message.

Alternatively, the data control icon is the icon indicating a control operation that can be performed on the data selected from the data list. The data control icon is not limited to the above described control operations (delete, deliver, shift to a storage region) and may include other various control operations.

Figure 16A:
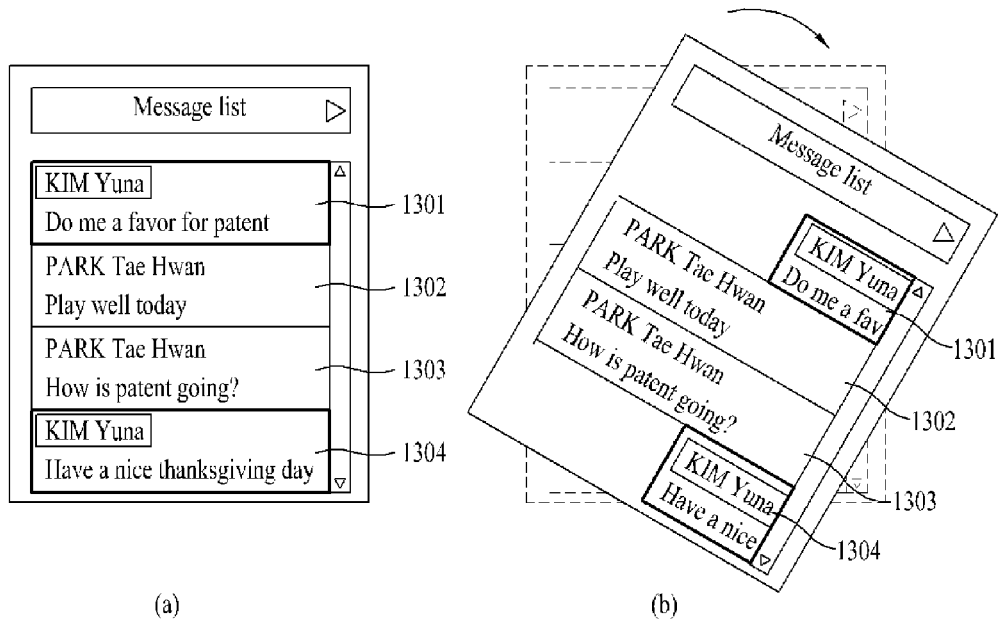
FIGS. 16A and 16B are diagrams for receiving an input of a specific message extracting command signal using a motion detection sensor according to the present invention.
Figure 16B:
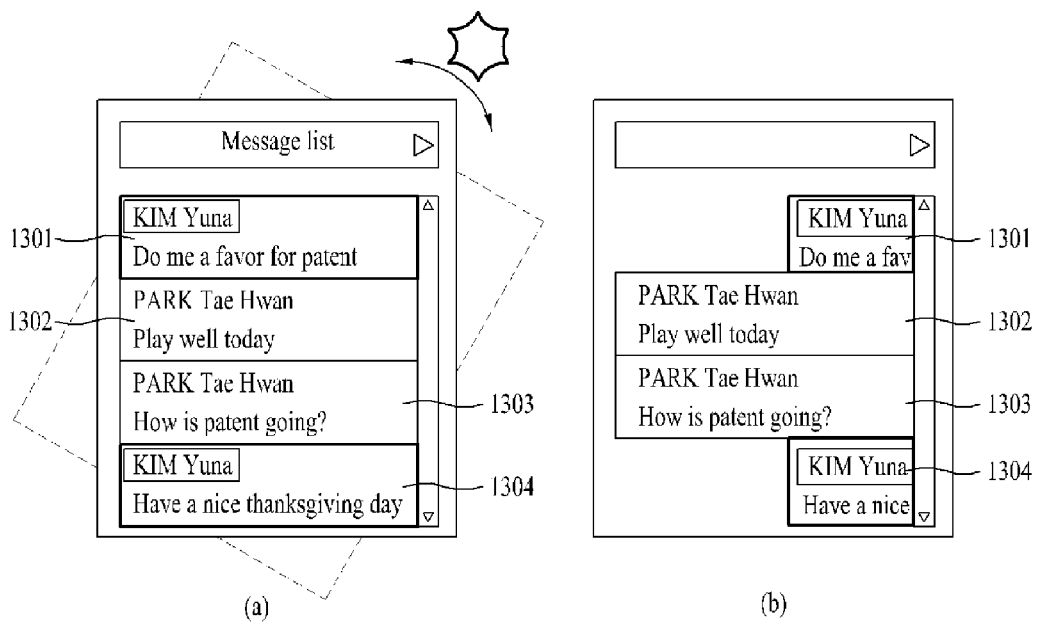

FIGS. 16A and 16B are diagrams for receiving an input of a specific message extracting command signal using a motion detection sensor 142 (FIG. 1) according to the present invention. In the following example, a received message list is taken as an example of a data list.

Referring to FIG. 16A, while messages including the originator 'KIM Yuna' are selected from the received message list, as illustrated in FIG. 16A (a), if the motion detection sensor 142 (FIG. 1) detects that the mobile terminal 100 is inclined in one direction, the mobile terminal 100 receives an input of an extraction command signal for the selected messages. When the extraction command signal is input, the mobile terminal 100 extracts the selected messages, shifts positions of the extracted messages in the inclined direction and adjusts shift distances of the extracted messages according to the degree of inclination.

Referring to FIG. 16B, while messages including the originator 'KIM Yuna' are selected from the received message list, as illustrated in FIG. 16B (a), if the motion detection sensor 142 (FIG. 1) detects a tapping action on the mobile terminal 100, the mobile terminal 100 receives an input of an extraction command signal for the selected messages. When the extraction command signal is input, the mobile terminal 100 extracts the selected messages and adjusts shift distances of the extracted messages according to a count or strength of the tapping action.

Figure 17A:
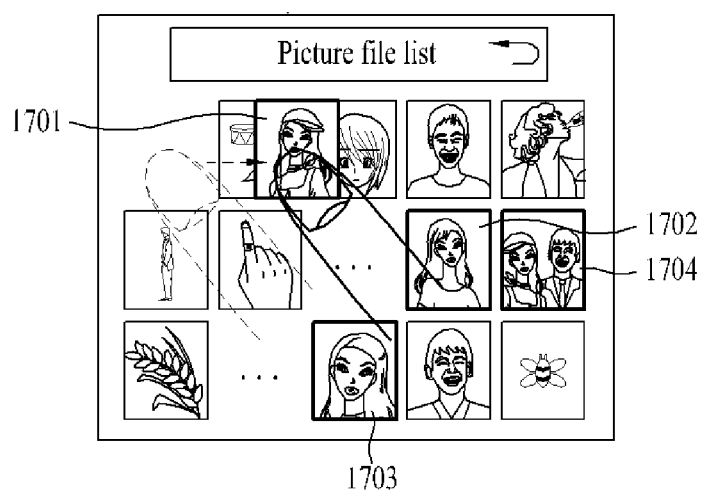
FIGS. 17A to 17C are diagrams of screen configurations for extracting a specific picture file meeting a specific classification condition using a picture file list according to the present invention.
Figure 17A:
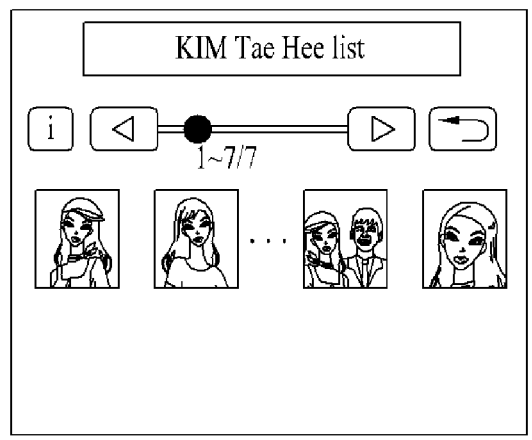
Figure 17B:
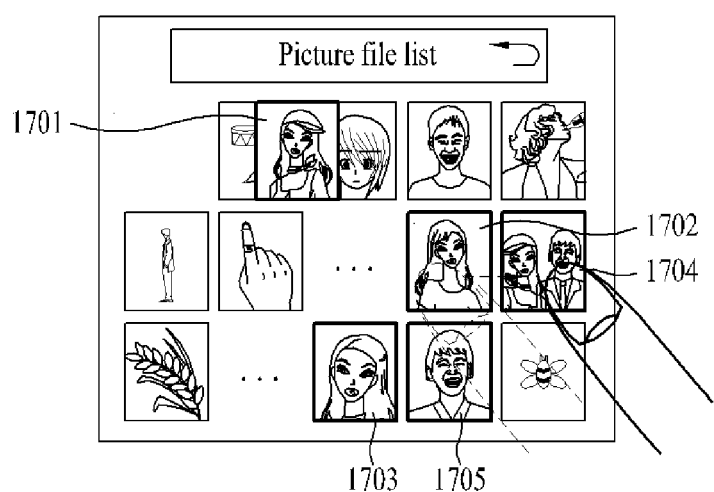
Figure 17B:
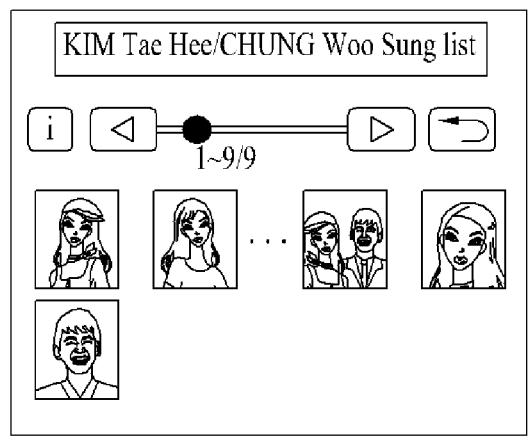
Figure 17C:
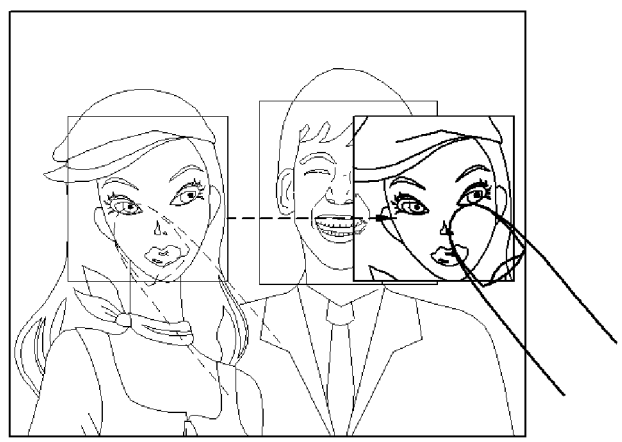
Figure 17C:
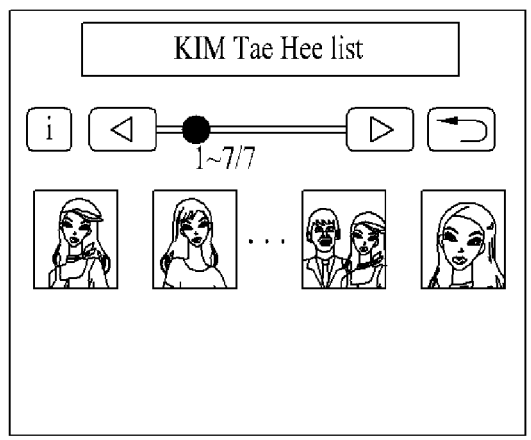

FIGS. 17A to 17C are diagrams of screen configurations for extracting a specific picture file meeting a specific classification condition using a picture file list according to the present invention. In the following example, a picture file list is taken as an example of a data list.

If a picture file list including a plurality of picture files is displayed as thumbnails, the mobile terminal 100 receives a touch and drag action in a first direction for the first picture file 1701 including one object (first object), as illustrated in FIG. 17A (a). The mobile terminal 100 selects and extracts picture files including the first object included in the first picture file 1701 and shifts positions of the extracted picture files in the first direction to correspond to the input touch and drag action in the first direction.

When the touch and drag action is completed, the mobile terminal 100 displays an extracted picture file list constructed with the position shifted picture files, as illustrated in FIG. 17A (b). The extracted picture files may not be included in the picture file list shown in FIG. 17A.

If the picture file list including a plurality of the picture files is displayed as thumbnails, the mobile terminal 100 receives an input of a touch and drag action in the first direction for a fourth picture file 1704 including a plurality of objects (second and third objects), as illustrated in FIG. 17B (a). The mobile terminal 100 selects and extracts the picture files including the second or third object included in the fourth picture file 1704 and shifts positions of the extracted picture files in the first direction to correspond to the input touch and drag action in the first direction.

When the touch and drag action is completed, the mobile terminal 100 displays an extracted picture file list constructed with the position shifted picture files (the second or third object included), as illustrated in FIG. 17B (b). The extracted picture files may not be included in the picture file list shown in FIG. 17A.

While a specific picture is displayed, if an input of a touch and drag action in the first direction for a specific object included in the specific picture is received, as illustrated in FIG. 17C (a), the mobile terminal 100 extracts picture files including the specific object and displays an extracted picture file list constructed with the extracted picture files, as illustrated in FIG. 17C (b).

According to the present invention, if data meeting a specific classification condition is selected from a plurality of data included in a data list, the mobile terminal 100 receives an input of a command signal for deleting the rest of the data except the selected data and deletes the rest of the data from the data list under the control of the controller 180.

Figure 18A:
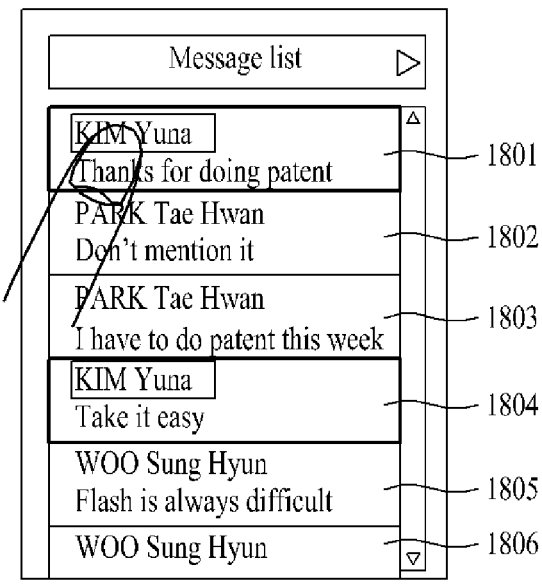
FIGS. 18A to 18C are diagrams for receiving an input of a command signal for deleting data failing to meet a specific classification condition according to the present invention.
Figure 18A:
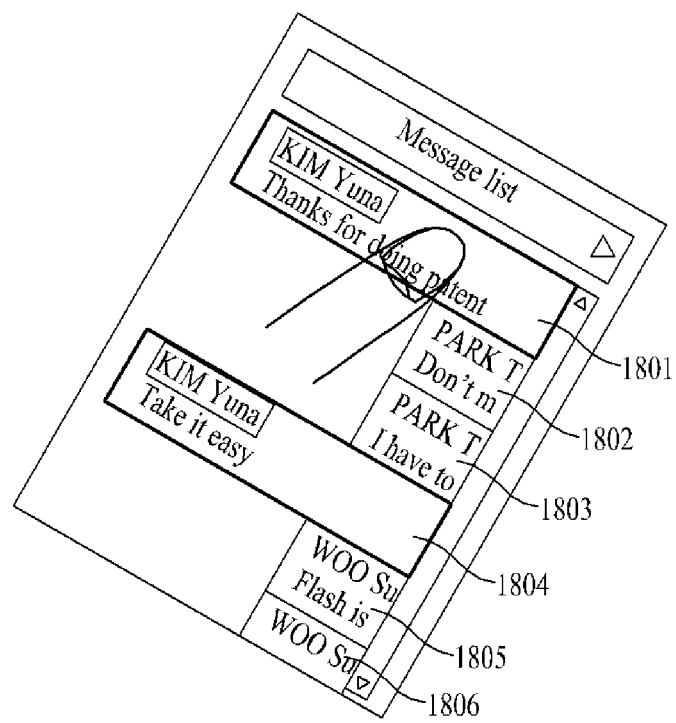
Figure 18B:
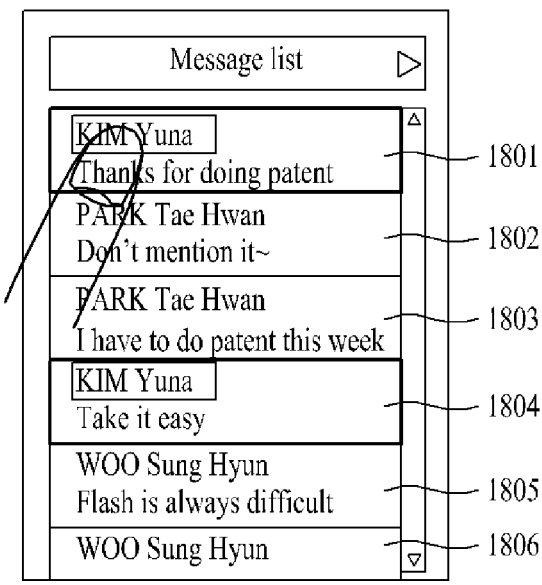
Figure 18B:
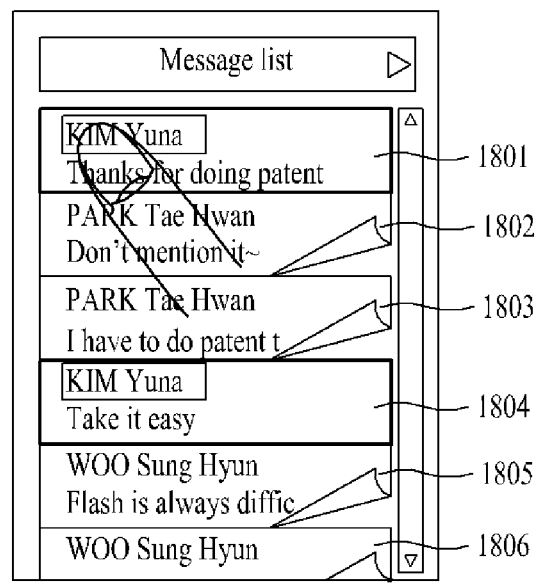
Figure 18C:
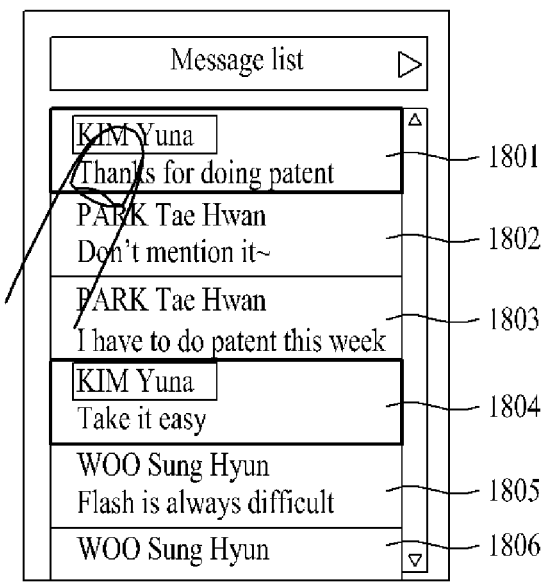
Figure 18C:
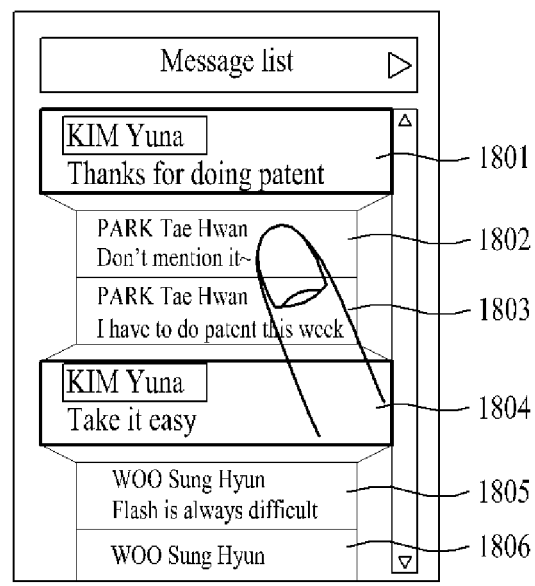

In the following description, a process for receiving an input of a command signal for deleting data failing to meet a specific classification condition is explained with reference to FIGS. 18A to 18C. In the following example, a received message list is taken as an example of a data list. FIGS. 18A to 18C are diagrams for receiving an input of a command signal for deleting data failing to meet a specific classification condition according to the present invention.

While a received message list including a plurality of messages is displayed, if an input of a touch and drag action for a display region of an originator 'KIM Yuna' is received, the mobile terminal 100 selects the messages 1801, 1804 that include the originator 'KIM Yuna', as illustrated in FIG. 18A (a). Subsequently, if an input of a command action for holding the selected messages 1801, 1804 from a user is received, the mobile terminal 100 holds the selected messages 1801, 1804.

If the motion detection sensor 142 (FIG. 1) of the mobile terminal 100 detects an inclination of the mobile terminal 100, the mobile terminal 100 shifts positions of the rest of the messages except the held messages 1801, 1804 among a plurality of the messages in the inclined direction, as illustrated in FIG. 18A (b). The mobile terminal 100 displays a message list constructed with the held messages 1801 and 1804 only and deletes the position shifted remaining messages or stores the position shifted remaining messages in a separate storage region.

Referring to FIG. 18B, if an input of a command action for holding the selected messages 1801, 1804 is received, the mobile terminal 100 holds the selected messages 1801, 1804. If a wind is detected using a wind detecting sensor, such as the microphone 122, the mobile terminal 100 displays the rest of the messages except the held messages 1801 and 1804 among a plurality of the messages in a flying form, as illustrated in FIG. 18B (b). The wind may be produced by a user blowing into the microphone 122. The mobile terminal 100 displays a message list constructed with the held messages 1801, 1804 only and deletes the remaining messages displayed in the flying form or stores the remaining messages displayed in the flying form in a separate storage region.

Referring to FIG. 18C, if the messages 1801 and 1804 including the originator 'KIM Yuna' are selected from a plurality of the messages included in the received message list, the mobile terminal 100 moves the remaining unselected messages among a plurality of the messages backward so as to be depicted behind the selected messages 1801, 1804. Furthermore, if the touch of the remaining unselected messages continues, they are depicted to be moved further behind the selected messages 1801, 1804. If the remaining unselected messages are touched for more than a predetermined amount of time, the mobile terminal 100 displays a message list constructed with only the selected messages 1801, 1804.

According to the present invention, under the control of the controller 180, the mobile terminal 100 performs a control operation of data extracted according to a specific classification condition. This is explained in detail with reference to FIGS. 19A to 19D. In the following example, an extracted data list is an extracted message list.

Figure 19A:
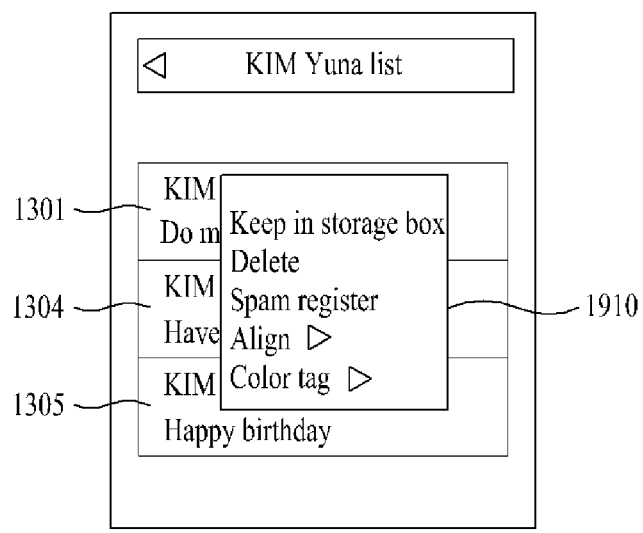
FIGS. 19A to 19D are diagrams for performing a control operation for data extracted by meeting a specific classification condition according to the present invention.
Figure 19B:
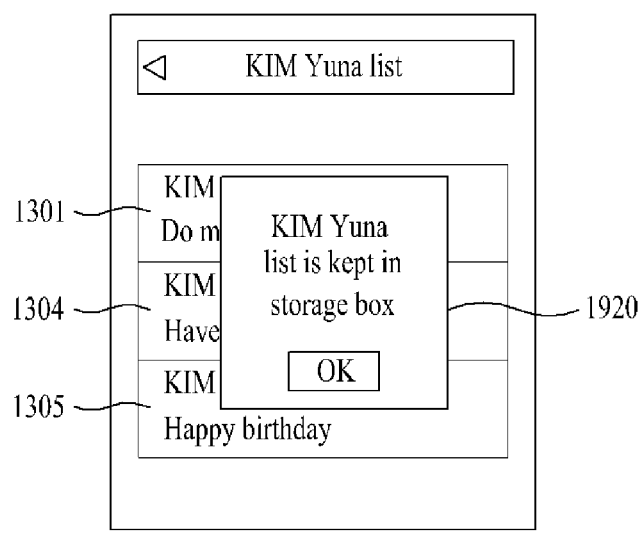

If an extracted message list is displayed, the mobile terminal 100 displays a control operation list 1910 that is executable on the messages configuring the extracted message list, as illustrated in FIG. 19A. Referring to FIG. 19B, if a 'Keep in storage box' icon is selected from the control operation list 1910 of FIG. 19A, the mobile terminal 100 stores the extracted message list and the messages configuring the extracted message list in the storage box.

Figure 19C:
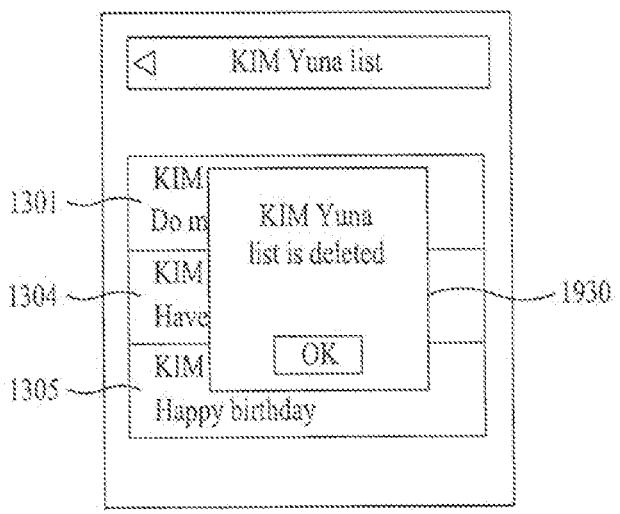

Referring to FIG. 19C, if 'Delete' is selected from the control operation list 1910 of FIG. 19A, the mobile terminal 100 deletes the messages configuring the extracted message list.

Figure 19D:
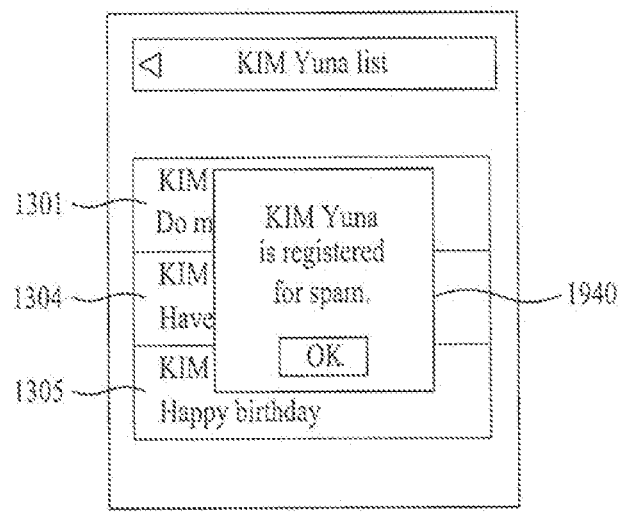

Referring to FIG. 19D, if 'Spam register' is selected from the control operation list 1910 of FIG. 19A, the mobile terminal 100 registers the message list for the originator 'KIM Yuna', which is the classification condition of the extracted message list, as spam.

The above-described data extracting methods can be implemented in a program recorded medium as computer-readable codes. The computer-readable media include all types of recording devices in which data readable by a computer system are stored. The computer-readable media include ROM, RAM, CD-ROM, magnetic tapes, floppy discs, optical data storage devices, to name a few, and also include carrier-wave type implementations (e.g., transmission via Internet).

The above-described mobile terminal and data extracting method can be configured in a manner of selectively combining the embodiments entirely or partially to enable various modifications instead of being limited to the configurations and methods of the above-described embodiments.

The present invention provides the following effects and/or advantages. The present invention selects data meeting a specific classification condition in the course of displaying a data list constructed with a plurality of data, thereby selecting and extracting other data meeting the specific classification condition together. The present invention enables data meeting a specific classification condition to be quickly and conveniently selected and extracted by a simple input action without an image change while a data list constructed with a plurality of data is displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and/or their equivalents.

What is claimed is:

1. A mobile terminal, comprising: a touchscreen configured to display a data list including a plurality of data items and to receive a first input for selecting a classification condition within a desired data
   item among the plurality of data items; and a controller configured to: control the touchscreen to distinctively display the entire desired data item and distinctively display the classification condition within the desired data item, in response to the first input; identify at least one relevant data item of the plurality of data items from a remainder of the plurality of data items in response to the first input, the at least one relevant data item; and further control the touchscreen to distinctively display the entire at least one relevant data item satisfying the same classification condition and distinctively display the classification condition within the at least one relevant data item, concurrent with distinctively displaying the entire desired data item and the classification condition within the desired data item ; the touchscreen is further configured to display one or more data control icons on a prescribed region of the touchscreen and to receive a touch and drag input of the desired data item and the at least one relevant data item to a desired one of the one or more data control icons; and
   the controller is further configured to perform a control action corresponding to the desired data control icon to which the desired data item and the at least one relevant data item are dragged.

2. The mobile terminal of claim 1, wherein:
the data list is a message list;
the plurality of data items are a plurality of messages in the message list;
the desired data item is a desired message among the plurality of messages; and
the classification condition comprises originator information, a message received date or a keyword included in the desired message.

3. The mobile terminal of claim 1, wherein:
the data list is an audio file list;
the plurality of data items are a plurality of audio files in the audio file list;
the desired data item is a desired audio file among the plurality of audio files; and
the classification condition comprises an audio file name, artist information or a keyword corresponding to the desired audio file.

4. The mobile terminal of claim 1, wherein:
the data list is a picture file list;
the plurality of data items are a plurality of picture files in the picture file list;
the desired data item is a desired picture file among the plurality of picture files; and
the classification condition comprises an object related to the desired picture file or a date of creation of the desired picture file.

5. The mobile terminal of claim 1, wherein:
the data list is a contact file list;
the plurality of data items are a plurality of contact files in the contact file list;
the desired data item is a desired contact file among the plurality of contact files; and
the classification condition comprises a contact name corresponding to the desired contact file, a group name or at least a portion of a phone number.

6. The mobile terminal of claim 1, wherein:
the data list is a schedule list;
the plurality of data items are a plurality of schedule items in the schedule list;
the desired data item is a desired schedule item among the plurality of schedule items; and
the classification condition comprises a schedule type, a schedule name, a participant included in the desired schedule item, a keyword included in the desired schedule item or a schedule date.

7. The mobile terminal of claim 1, wherein the touchscreen is further configured to receive the first input on a display region of the touchscreen at which the classification condition within the desired data item is located.

8. The mobile terminal of claim 1, wherein the controller is further configured to control the touchscreen to distinctively display the selected classification condition as a portion of content of both the desired data item and the relevant data item.

9. The mobile terminal of claim 1, wherein the controller is further configured to extract the desired data item and the at least one relevant data item from the data list in response to the mobile terminal receiving a second input.

10. The mobile terminal of claim 9, further comprising a motion detection sensor configured to detect a tapping on the mobile terminal in a tapping direction and an inclination of the mobile terminal in an inclination direction;
wherein the second input is received by the mobile terminal via at least a detection on the touchscreen of a touch and drag action upon the desired data item, detection of a tapping on the mobile terminal in the tapping direction via the motion detection sensor or detection of an inclination of the mobile terminal in the inclination direction via the motion detection sensor.

11. The mobile terminal of claim 9, wherein the touchscreen is further configured to display the data list including the remainder of the plurality of data items or the desired data item and the at least one relevant data item upon completion of extracting the desired data item and the at least one relevant data item.

12. The mobile terminal of claim 1, wherein the controller is further configured to delete at least one data item of the remainder of the plurality of data items from the data list in response to a delete command signal received via the touchscreen.

13. The mobile terminal of claim 1, wherein:
the touchscreen is further configured to receive a keyword extension command while displaying the data list and to receive the first input for selecting a keyword as the classification condition; and
the controller is further configured to control the touchscreen, in response to the keyword extension command, to distinctively display the selected keyword included in each of the plurality of data items that include the keyword.

14. A mobile terminal, comprising: a touchscreen configured to display a data list including a plurality of data items and to receive a first input for selecting a classification condition within a desired data item among the plurality of data items; and a controller configured to:
control the touchscreen to distinctively display the entire desired data item and distinctively display the classification condition within the desired data item, in response to the first input; identify at least one relevant data item of the plurality of data items from a remainder of the plurality of data items in response to the first input, the at least one relevant data item satisfying the same classification condition;
further control the touchscreen to distinctively display the entire at least one relevant data item and distinctively display the classification condition within the at least one relevant data item, concurrent with distinctively displaying the entire desired data item and the classification condition within the desired data item; and
extract the distinctively displayed desired data item and the distinctively displayed at least one relevant data item ;
the touchscreen is further configured to receive a keyword extension command while displaying the data list and to receive the first input for selecting a keyword as the classification condition; and
the controller is further configured to control the touchscreen, in response to the keyword extension command, to distinctively display the selected keyword included in each of the plurality of data items that include the keyword.

15. A method of extracting data in a mobile terminal, the method comprising:
displaying a data list including a plurality of data items on a touchscreen;
receiving a first input via the touchscreen for selecting a classification condition within a desired data item among the plurality of data items;
distinctively displaying, via the touchscreen, the entire desired data item and the classification condition within the desired data item, in response to the first input; identifying at least one relevant data item of the plurality of data items from a remainder of the plurality of data items in response to the first input, the at least one relevant data item satisfying the same classification condition; and
distinctively displaying, via the touchscreen, the entire at least one relevant data item and distinctively displaying the classification condition within the at least one relevant data item, concurrent with distinctively displaying the entire desired data item and the classification condition within the desired data item;
displaying on the configured touchscreen one or more data control icons on a prescribed region of the touchscreen and receiving a touch and drag input of the desired data item and the at least one relevant data item to a desired one of the one or more data control icons; and
performing on the configured controller a control action corresponding to the desired data control icon to which the desired data item and the at least one relevant data item are dragged.

16. The method of claim 15, wherein receiving the first input comprises receiving the first input on a display region of the touchscreen at which the classification condition within the desired data item is located.

17. The method of claim 15, further comprising extracting the desired data item and the at least one relevant data item from the data list in response to the mobile terminal receiving a second input.

18. The method of claim 17, wherein the second input is received by the mobile terminal via at least detection on the touchscreen of a touch and drag action upon the desired data item, detection of tapping on the mobile terminal in a tapping direction via a motion detection sensor or detection of an inclination of the mobile terminal in an inclination direction via the motion detection sensor.

19. The method of claim 17, further comprising displaying the data list including the remainder of the plurality of data items or including the extracted data items upon completion of extracting the desired data item and the at least one relevant data item.

20. The mobile terminal of claim 9, wherein the controller is further configured to create a data storage region for storing the extracted desired data item and the extracted at least one relevant data item.

21. The mobile terminal of claim 14, wherein the controller is further configured to extract the desired data item and the at least one relevant data item from the data list in response to detection on the touchscreen of a touch and drag action upon the desired data item.

22. The method of claim 17, further comprising creating a data storage region via the controller for storing the extracted desired data item and the extracted at least one relevant data item.

* * * * *